(12) United States Patent
Watanabe et al.

(10) Patent No.: US 8,011,252 B2
(45) Date of Patent: Sep. 6, 2011

(54) PRESSURE SENSOR

(75) Inventors: Jun Watanabe, Chigasaki (JP); Hisao Motoyama, Minamisoma (JP)

(73) Assignee: Epson Toyocom Corporation, Tokyo (JP)

( * ) Notice: Subject to any disclaimer, the term of this patent is extended or adjusted under 35 U.S.C. 154(b) by 51 days.

(21) Appl. No.: 12/694,916

(22) Filed: Jan. 27, 2010

(65) Prior Publication Data

US 2010/0224003 A1 Sep. 9, 2010

(30) Foreign Application Priority Data

Mar. 4, 2009 (JP) ................................. 2009-051176

(51) Int. Cl.
G01L 9/00 (2006.01)
(52) U.S. Cl. ........................................... 73/717; 73/733
(58) Field of Classification Search .................. None
See application file for complete search history.

(56) References Cited

U.S. PATENT DOCUMENTS

| | | | | |
|---|---|---|---|---|
| 2,906,095 | A * | 9/1959 | Whitehead, Jr. ............... | 60/592 |
| 4,215,570 | A | 8/1980 | Eer Nisse | |
| 4,321,500 | A | 3/1982 | Paros et al. | |
| 4,372,173 | A | 2/1983 | Eer Nisse et al. | |
| 4,382,385 | A | 5/1983 | Paros | |
| 4,384,495 | A | 5/1983 | Paros | |
| 4,406,966 | A | 9/1983 | Paros | |
| 4,455,874 | A | 6/1984 | Paros | |
| 5,488,868 | A | 2/1996 | Ootake et al. | |
| 5,644,285 | A * | 7/1997 | Maurer ........................... | 338/39 |
| 6,497,152 | B2 | 12/2002 | Paros et al. | |
| 6,595,054 | B2 | 7/2003 | Paros et al. | |
| 6,843,132 | B2 | 1/2005 | Mizuno et al. | |
| 7,296,473 | B2 | 11/2007 | Ishii | |
| 7,404,328 | B2 | 7/2008 | Matsui | |
| 2009/0241679 | A1 * | 10/2009 | Motoyama ....................... | 73/717 |
| 2009/0308167 | A1 * | 12/2009 | Motoyama ....................... | 73/717 |
| 2009/0308168 | A1 * | 12/2009 | Motoyama ....................... | 73/717 |
| 2010/0018318 | A1 * | 1/2010 | Watanabe et al. ............... | 73/715 |
| 2010/0095778 | A1 * | 4/2010 | Sato ............................... | 73/756 |
| 2010/0275698 | A1 * | 11/2010 | Motoyama ....................... | 73/717 |

FOREIGN PATENT DOCUMENTS

JP A-56-119519 9/1981

(Continued)

*Primary Examiner* — Andre J Allen
(74) *Attorney, Agent, or Firm* — Oliff & Berridge PLC

(57) ABSTRACT

A pressure sensor includes: a housing having openings at both ends thereof; a pair of pressure-receiving devices configured to seal the openings respectively and transmit a pressure from the outside to the interior of the housing; a force transmission device configured to connect the pair of pressure-receiving devices and transmit a force that one of the pressure-receiving devices receives to the other pressure-receiving device; and a pressure-sensitive element having a pressure-sensitive portion and a pair of base portions to be connected to both ends of the pressure-sensitive portion, wherein a line connecting the pair of base portions and a detection axis, which is a direction of detection of the force, and the direction of displacement of the force transmission device are arranged in parallel; the one of the base portions is a first fixed portion, a pair of connecting devices extending from the other base portion so as to interpose the pressure-sensitive portion are connected respectively to a pair of second fixed portions arranged at positions in symmetry with respect to the first fixed portion, the first fixed portion is fixedly supported by the force transmission device, and the second fixed portions are supported and fixed to portions where a line connecting the first fixed portion and the pair of second fixed portions intersect the housing.

7 Claims, 17 Drawing Sheets

FOREIGN PATENT DOCUMENTS

| | | |
|---|---|---|
| JP | A-64-9331 | 1/1989 |
| JP | A-64-86608 | 3/1989 |
| JP | A-2-228534 | 9/1990 |
| JP | A-7-19981 | 1/1995 |
| JP | B2-2639527 | 8/1997 |
| JP | A-2004-347387 | 12/2004 |
| JP | A-2005-17050 | 1/2005 |
| JP | A-2005-121628 | 5/2005 |
| JP | A-2006-194736 | 7/2006 |
| JP | A-2007-57395 | 3/2007 |
| JP | A-2007-132697 | 5/2007 |
| JP | A-2008-232886 | 10/2008 |
| JP | A-2008-258085 | 10/2008 |

* cited by examiner

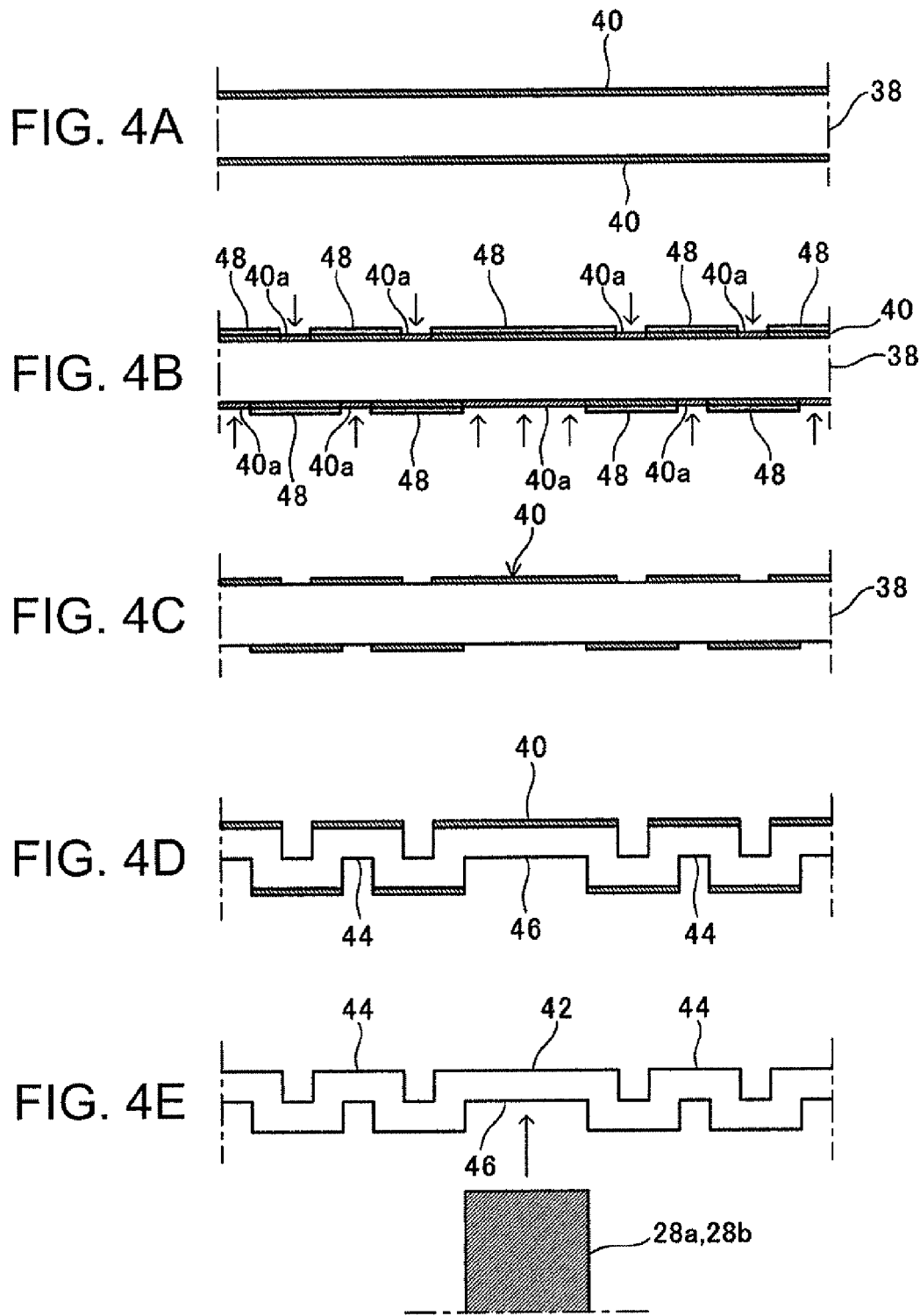

PRESSURE SENSOR

BACKGROUND

1. Technical Field

The present invention relates to a pressure sensor using a pressure-sensitive element and a diaphragm and, specifically, to a technique to reduce an error of a pressure measurement value of the pressure sensor due to a temperature change caused by the fact that different types of materials are combined.

2. Description of the Related Art

In the related art, a pressure sensor using a piezoelectric resonator as a pressure-sensitive element is known as a water pressure meter, a barometer, a differential pressure gauge or the like. The piezoelectric resonator includes an electrode pattern formed on a plate-shaped piezoelectric substrate having a detection axis set in the direction of detection of a force, and being configured to vary in resonance frequency of the piezoelectric resonator when a pressure is applied thereto in the direction of the detection axis, whereby the pressure is detected from the variation in the resonance frequency. In JP-A-2007-57395, a pressure sensor according to a first related art is disclosed. FIG. 18 shows a pressure sensor according to the related art. A pressure sensor 201 in the related art includes an air-tight case 202 having a vacuum or inactive atmosphere in the interior thereof, a first pressure input port 203a and a second pressure input port 204a formed respectively on opposing first and second wall surfaces 203 and 204 of the air-tight case 202 so as to penetrate therethrough, a cylindrical first bellows 210 being fixed at an opening at one end thereof to the first wall surface 203 and having an axial hole communicating with the first pressure input port 203a, a cylindrical second bellows 211 being fixed at an opening at one end thereof to the second wall surface 204, having an axial hole communicating with the second pressure input port 204a arranged in series with the first bellows 210, a resonator bonding base 215 fixedly arranged between other ends 210a and 211a of the first and second bellows 210 and 211, a thin-plate shaped piezoelectric resonator 220 supported by the resonator bonding base 215, a piezoelectric reinforcing panel 221 arranged at a position opposing the piezoelectric resonator 220 with the second bellows 211 interposed therebetween, and an electronic oscillator 230 in conduction with the electrode pattern on the piezoelectric resonator.

The piezoelectric resonator 220 is fixed at one end thereof to the second wall surface 204, and at the other end thereof to the resonator bonding base 215. The piezoelectric reinforcing panel 221 is fixed at both end portions by the second wall surface 204 and the resonator bonding base 215. The resonator bonding base 215 and an inner wall of the air-tight case 202 are fixed by a spring for a reinforcing panel to enhance the durability for an impact in the X-axis direction.

The piezoelectric resonator 220 includes a configuration formed with an electrode on a quartz crystal substrate, for example. The resonator bonding base 215 includes a base portion 215a configured to be fixed in a state of being interposed between the other ends 210a and 211a of the both bellows 210 and 211, and a supporting strip 215b projecting from an outer periphery of the base portion 215a toward the second wall surface, and the other end portions of the piezoelectric resonator 220 and the piezoelectric reinforcing panel 221 are both connected to the supporting strip 215b.

The pressure input ports 203a and 204a communicate with axial holes in the interiors of the bellows 210 and 211 respectively, while the axial holes in the interiors of the bellows are maintained in a non-communication state by the base portion 215a of the resonator bonding base 215. Therefore, the position of the resonator bonding base 215 is moved forward and backward in the direction of the axes of the bellows in association with the expansion and contraction of the bellows due to the pressure difference of between pressures P1 and P2 supplied from the both pressure input ports 203a and 204a. The piezoelectric resonator 220 fixed at one end thereof to the resonator bonding base 215 and at the other end thereof to the second wall surface 204 is deformed by receiving a mechanical stress in the axial direction by a pressure transmitted from the resonator bonding base 215, so that the specific resonance frequency varies. In other words, the piezoelectric substrate is excited by a distribution power to an excitation electrode in a state in which the electronic oscillator 230 arranged at adequate positions in the air-tight case 202 in an air-tight state is connected to the excitation electrode on the piezoelectric substrate constituting the piezoelectric resonator 220, and the pressure P1 or P2 is calculated by the output frequency at this time.

According to the pressure sensor 201 in the related art, when the pressure P1 is input to the first pressure input port 203a, a force corresponding to the pressure is applied to the piezoelectric resonator 220 and the piezoelectric reinforcing panel 221. Because of the presence of the piezoelectric reinforcing panel 221, only a force in the direction of a longitudinal side (Y-axis direction in the drawing in the case of a quartz crystal resonator) is applied to the piezoelectric resonator 220, so that primary pressure-frequency characteristics of the piezoelectric resonator demonstrates a quadratic curve. Therefore, the resonance frequency of the piezoelectric resonator 220 changes linearly according to the pressure P1 so that the pressure sensor 201 having high degree of accuracy is obtained.

However, in the related art, it is difficult to bring the linear expansion coefficient of the piezoelectric resonator 220 and the air-tight case 202 into conformity. Therefore, the stress applied to the piezoelectric resonator changes with the change in temperature, and the stress change due to the temperature change appears as an error of the pressure measurement value. In JP-A-2007-57395, the bellows are used for making the pressure measurement value little susceptible to the linear expansion coefficient. However, the effect of the linear expansion coefficient cannot be made zero by the bellows.

SUMMARY

An advantage of some aspects of the invention is to provide a pressure sensor with high degree of accuracy in which an error of a pressure measurement value caused by the usage of materials having different linear expansion coefficient is reduced.

The invention is intended to solve at least part of the problems describe above, and can be implemented in the following aspects.

A first aspect of the invention is directed to a pressure sensor including: a housing having openings at both ends thereof; a pair of pressure-receiving devices configured to seal the openings respectively and transmit a pressure from the outside to the interior of the housing; a force transmission device configured to connect the pair of pressure-receiving devices and transmit a force that one of the pressure-receiving devices receives to the other pressure-receiving device; and a pressure-sensitive element having a pressure-sensitive portion and a pair of base portions to be connected to both ends of the pressure-sensitive portion, in which a line connecting the pair of base portions, a detection axis, which is a direction of detection of the force, and the direction of displacement of the force transmission device are arranged in parallel; the one of the base portions is a first fixed portion, a pair of connecting devices extending from the other base portion so as to interpose the pressure-sensitive portion are connected respectively to a pair of second fixed portions arranged at positions in symmetry with respect to the first fixed portion, the first fixed portion is fixedly supported by the force transmission device, and the second fixed portions are supported and fixed to portions where a line connecting the first fixed portion and the pair of second fixed portions intersects the housing.

In this configuration, a connecting area of the pressure-sensitive element with the force transmission device and connecting areas of the same with the housing are aligned on a line vertical to the detection axis of the pressure-sensitive element. Since the connecting devices are formed of the same material as the pressure-sensitive element and are members extending from the other end of the pressure-sensitive element, even though the pressure-sensitive element is expanded or contracted in the direction of the detection axis due to the temperature change, the relative position of the connecting area described above in the direction of the detection axis is not changed. Therefore, the pressure-sensitive element is avoided from receiving a stress caused by the linear expansion of the pressure-sensitive element.

In addition, one end of the pressure-sensitive element is connected to a center portion of the force transmission device and the other end thereof is connected to a center portion of the side surface of the housing. At this time, even when the linear expansion coefficients of the housing and the force transmission device are different from each other, since the amounts of linear expansion in the directions of both ends of the housing with reference to the center portion of the housing are the same and the amounts of linear expansion in the directions of the both ends of the force transmission device with reference to the center portion of the force transmission device are the same, the relative position of the center portion of the housing and the center portion of the force transmission device in the direction of the detection axis does not change. Therefore, the pressure-sensitive element is avoided from receiving a stress caused by variations in relative position between the center portion of the housing and the center portion of the force transmission device.

A second aspect of the invention is directed to the pressure sensor of the first aspect, wherein at least one of the pair of pressure-receiving devices is a bellows expanding inward of the housing, and a pressure-receiving portion of the bellows and a force transmission device are connected.

Accordingly, the pressure sensor includes an opening formed by the bellows. Therefore, screwing a connector or the like into the opening is enabled, so that connection with the connector or the like is easily achieved.

A third aspect of the invention is directed to the pressure sensor of the first aspect, wherein the pair of pressure-receiving devices are second bellows expanding outward of the housing, and a pressure-receiving portion formed of the second bellows and the force transmission device are connected.

Accordingly, the second bellows are exposed outside the housing. Therefore, since the opening as described above is not provided, and hence occurrence of error in measured pressure due to entry of air or the like into the opening is restrained.

A fourth aspect of the invention is directed to the pressure sensor of any one of the first to third aspects, wherein the force transmission device is held by a cantilever being fixed at one end to the housing and at the other end on the opposite side from the one end to the force transmission device, and being capable of bending in the direction of displacement of the force transmission device.

Accordingly, the inclination of the force transmission device in directions other than the direction of the detection axis is restrained, and lowering of the sensitivity of the pressure sensor is prevented.

A fifth aspect of the invention is directed to the pressure sensor of any one of the first to fourth aspects, wherein the pressure-sensitive element includes the base portions provided at both end portions thereof, and an oscillating portion between the base portions provided at the both end portions.

In the pressure-sensitive element configured as described above, since variation in resonance frequency with respect to elongation and compression stresses is significantly large and hence the variable width of the resonance frequency is large, the pressure sensor superior in resolution such as those for detecting a slight pressure difference is constructed.

A sixth aspect of the invention is directed to the pressure sensor of any one of the first to fifth aspects, wherein the connecting devices are formed in symmetry in pair with the intermediary of the pressure-sensitive element.

Accordingly, the pressure-sensitive element is not bent toward the connecting member, and hence the pressure-sensitive element is prevented from moving in the direction other than the direction of the detection axis, the sensitivity of the pressure-sensitive element in the direction of the detection axis is improved, so that the pressure sensor with high degree of accuracy is achieved.

A seventh aspect of the invention is directed to the first to sixth aspects, wherein one end of the pressure-sensitive element and the connecting devices are connected by reinforcing portions. Accordingly, when the pressure-sensitive element and the connecting member are formed integrally, the pressure-sensitive element is prevented from being broken at the time of mounting, and hence improvement of yield and cost down of the pressure sensor are achieved.

BRIEF DESCRIPTION OF THE DRAWINGS

The invention will be described with reference to the accompanying drawings, wherein like numbers reference like elements.

FIGS. 4A to 4E are drawings showing the process of manufacturing the diaphragm according to the first embodiment.

DESCRIPTION OF EXEMPLARY EMBODIMENTS

Figure 1:
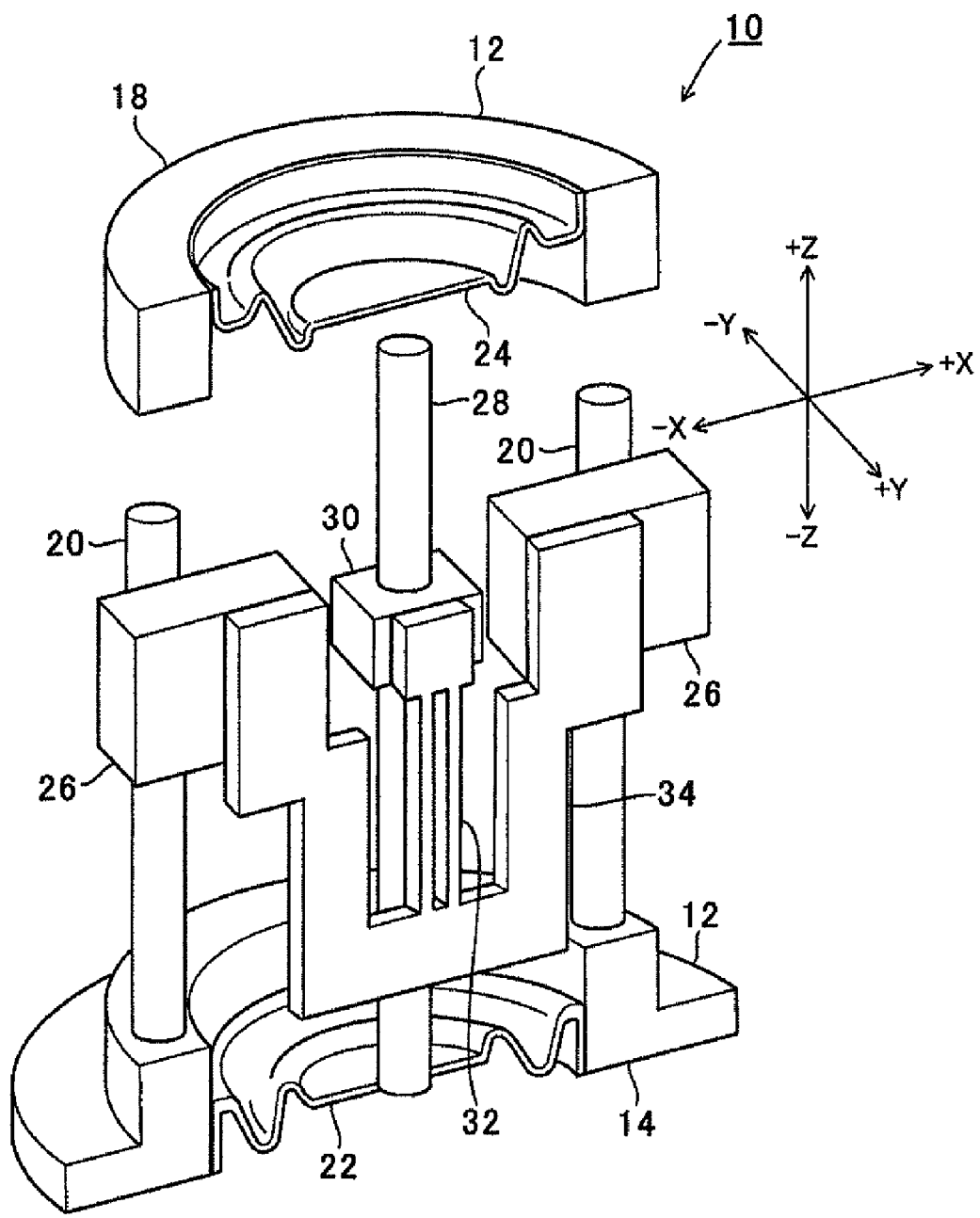
FIG. 1 is a perspective view of a pressure sensor according to a first embodiment.

The invention will be described in detail on the basis of embodiments shown in the drawings. However, components, types, combinations, shapes, and relative arrangements described in the embodiments are not intended to limit the scope of the invention and are given by way of example only unless otherwise specifically noted.

Figure 2:
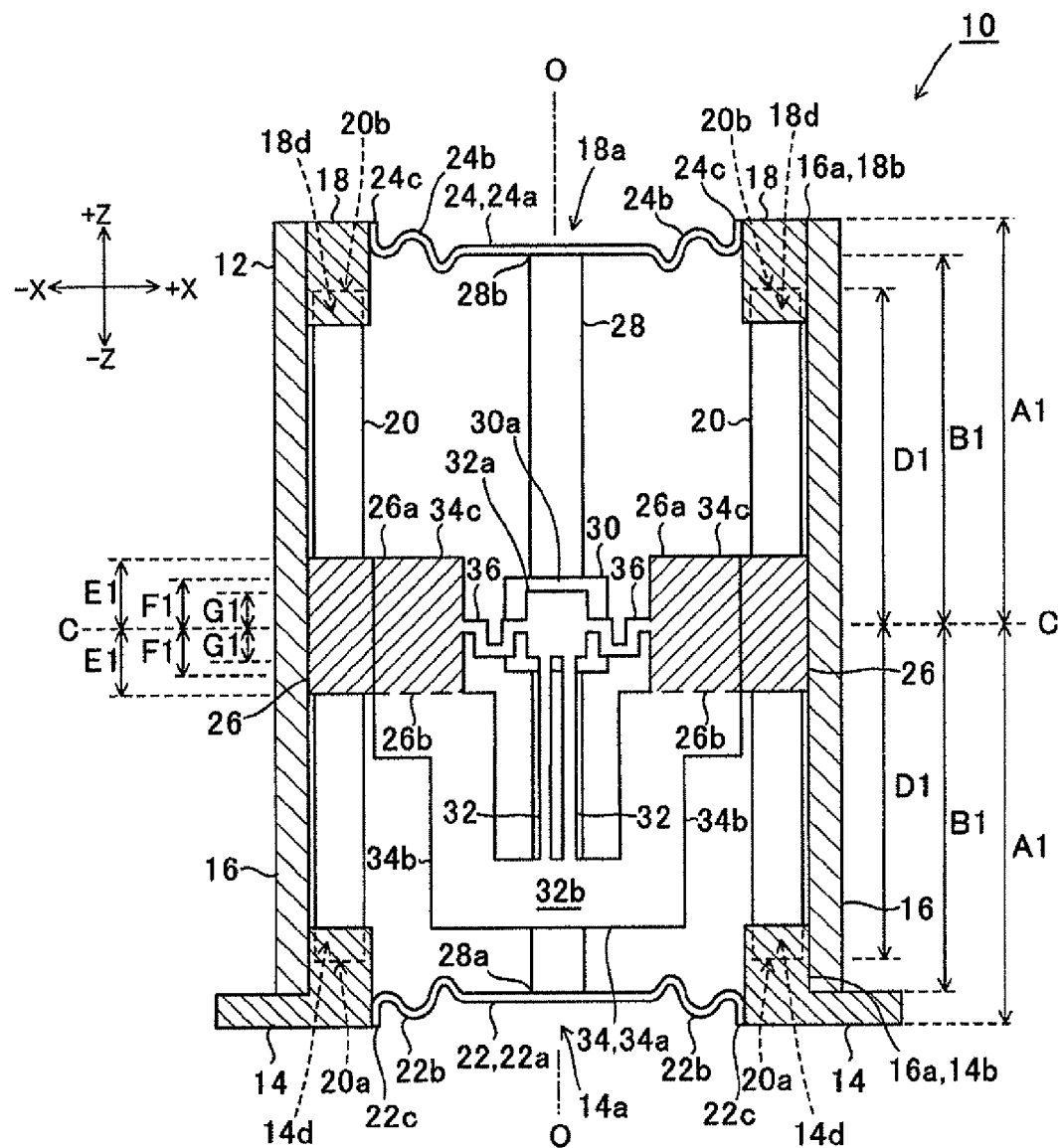
FIG. 2 is a diagrammatic front view of the pressure sensor according to the first embodiment.

A pressure sensor according to a first embodiment is shown in FIGS. 1 and 2. FIG. 1 is a perspective view, and FIG. 2 is a diagrammatic drawing viewed from the front (XZ plane). Reference signs XYZ in the drawings constitute an orthogonal coordinate system. A pressure sensor 10 according to the first embodiment includes a housing 12 having openings 14a and 18a at both ends thereof, a pair of pressure-receiving devices (first diaphragm 22 and second diaphragm 24) configured to seal the openings 14a and 18a respectively and transmit an outside pressure into the interior of the housing 12, a force transmission device (shaft 28) connecting the pair of pressure-receiving devices to transmit a force that one of the pressure-receiving devices receives to the other pressure-receiving device, and a pressure-sensitive element 32 having a pressure-sensitive portion (oscillating arm 32c) and a pair of base portions (first base portion 32a and second base portion 32b) to be connected to both ends of the pressure-sensitive portion (oscillating arm 32c). A line connecting the pair of base portions (first base portion 32a and second base portion 32b), a detection axis, which is a direction of detection of the force, and the direction of displacement of the force transmission device are arranged in parallel. One of the base portions (first base portion 32a) is a first fixed portion (first base portion 32a), and a pair of connecting devices (connecting members 34) extending from the other base portion (second base portion 32b) so as to interpose the pressure-sensitive portion (oscillating arm 32c) are connected respectively to a pair of second fixed portions (upper end portions 34c of connecting member 34) arranged at positions in symmetry with respect to the first fixed portion (first base portion 32a). The first fixed portion (first base portion 32a) is fixedly supported by the force transmission device (shaft 28). The second fixed portions (upper end portions 34c of connecting member 34) are supported and fixed to a portion (first fixed portion 26) where a line (centerline C) connecting the first fixed portion (first base portion 32a) and the pair of second fixed portions (upper end portions 34c of connecting member 34) intersects with the housing. The interior of the housing 12 is maintained under vacuum and sealed for measuring a relative pressure.

The housing 12 is configured to be sealed to maintain the interior under vacuum and store components described later therein. Accordingly, the pressure sensor 10 enhances a Q value of the pressure-sensitive element and ensures a stable resonance frequency, so that a long-term stability of the pressure sensor 10 is ensured.

The housing 12 is a cylindrical enclosure including members having a common center axis O arranged in ±Z directions, and includes a flange portion 14, a cylindrical side surface portion 16 (see FIG. 2, omitted in FIG. 1), and a hermetic terminal portion 18.

The flange portion 14 and the hermetic terminal portion 18 include the openings 14a and 18a both having a center at the center axis O. The circular first diaphragm 22 is connected to the opening 14a so as to seal the opening 14a, and the second diaphragm 24 having the same shape as the first diaphragm 22 is connected to the opening 18a so as to seal the opening 18a.

The flange portion 14 and the hermetic terminal portion 18 are formed with nibs 14d and 18d (see FIG. 2) on surfaces opposing to each other thereof, and the flange portion 14 and the hermetic terminal portion 18 are connected via supporting shafts 20 by fitting the supporting shaft 20 into the nibs 14d and 18d. The supporting shafts 20 are a rod-shaped member having a constant rigidity and having a longitudinal direction in the ±Z directions and are arranged in the interior of the housing 12 with one end 20a of each fitted into the each nib 14d of the flange portion 14 and the other end 20b of each fitted into the each nib 18d of the hermetic terminal portion 18, whereby a constant rigidity is ensured among the flange portion 14, the supporting shafts 20 and the hermetic terminal portion 18. The supporting shafts 20 have the centerline C which corresponds to a bisectional line of the longitudinal direction thereof. The amount of linear expansion of the supporting shafts 20 in the +Z direction and in the −Z direction from the centerline C always matches, and the position of the bisectional line thereof is never displaced from the centerline C in the ±Z directions in association with the temperature change. Although the number of the supporting shafts 20 shown in FIG. 2 is two, three or more supporting shafts 20 may be provided as long as they do not interfere with the first fixed portions 26 and a cantilever 94 (see FIG. 10).

The side surface portion 16 is a member configured to seal a side surface of the housing 12 and fix the first fixed portions 26 described later, and has the centerline C which corresponds to a bisectional line of the side surface portion 16 in the ±Z directions. Therefore, the amount of linear expansion of the side surface portion 16 in the +Z direction and in the −Z direction from the centerline C always matches, and the position of the bisectional line thereof is never displaced from the centerline C in the ±Z directions in association with the temperature change. An inner periphery 16a of the side surface portion 16 has the same size as an outer periphery 18b of the hermetic terminal portion 18 and an outer periphery 14b of a thick region of the flange portion 14, and the inner periphery 16a is connected to the outer periphery 14b and the outer periphery 18b.

As shown in FIG. 2, a pair of the first fixed portions 26 are provided at a center portion of the side surface of the housing 12, that is, a center portion inside the side surface portion 16 at positions on the centerline C (plane parallel to XY plane) which bisections the length of the housing 12 in the ±Z directions so as to interpose the pressure-sensitive element 32 therebetween, and the connecting member 34, described later, is connected to the first fixed portions 26. The first fixed portions 26 are assumed to secure a constant rigidity in conjunction with the housing 12.

The shaft 28 is a rod-shaped member having a constant rigidity and having a longitudinal direction in the ±Z directions. The shaft 28 is arranged in the interior of the housing 12, and is connected at one end 28a in the longitudinal direction (±Z directions) to the first diaphragm 22, and at the other end 28b opposite from the one end 28a to the second diaphragm 24. The shaft 28 is arranged in line symmetry with respect to the centerline C, and the centerline C corresponds to a bisectional line of the shaft 28. Accordingly, the amount of linear expansion of the shaft 28 in the +Z direction and in the −Z direction from the centerline C always matches, and the position of the bisectional line of the shaft 28 is never displaced from the centerline C in the ±Z directions in association with the temperature change.

A second fixed portion 30 is fixed to a position at a center of the longitudinal direction of the shaft 28 (on the centerline C). The second fixed portion 30 includes a through hole (not shown) which penetrates in the ±Z directions. The shaft 28 is inserted through the through hole (not shown), and the second fixed portion 30 is fixed to the shaft 28. The first base portion 32a located at one end of the direction of detection axis (±Z directions) of the pressure-sensitive element 32 is fixed to the second fixed portion 30. Since the second fixed portion 30 has a bisectional line so as to match the centerline C, the amount of linear expansion of the shaft in the +Z direction and in the −Z direction from the centerline C always matches, and the position of the bisectional line of the shaft 28 is never displaced from the centerline C in the ±Z directions in association with the temperature change.

As shown in FIG. 2, the lengths of the entire housing 12 from the centerline C in the +Z direction and in the −Z direction are equally A1, the lengths of the shaft 28 from the centerline C in the +Z direction and in the −Z direction are equally B1, the lengths of the supporting shafts 20 from the centerline C in the +Z direction and in the −Z direction are equally D1. The first fixed portions 26 are fixed to a position in line symmetry with respect to the centerline C, and the lengths in the +Z direction and in the −Z direction are equally E1. When pressures applied to the first diaphragm 22 and to the second diaphragm 24 are the same, the second fixed portion 30 is fixed to a position in line symmetry with respect to the centerline C, and the lengths in the +Z direction and in the −Z direction are equally F1. The first base portion 32a of the pressure-sensitive element 32 described later is also fixed to a position in line symmetry with respect to the centerline C and the lengths in the +Z direction and in the −Z direction are equally G1.

Accordingly, the amounts of linear expansion in the +Z direction and in the −Z direction from the centerline C of the side surface portion 16, the supporting shafts 20, the first fixed portions 26, the shaft 28, the second fixed portion 30, and the first base portion 32a described later always match, and the bisectional lines in the ±Z directions of the respective members are not displaced due to the temperature change.

The material of the housing 12 (flange portion 14, side surface portion 16, and hermetic terminal portion 18), the supporting shafts 20, the first fixed portions 26, the shaft 28, and the second fixed portion 30 may be any material as long as it has a constant rigidity, but ceramic or the like having a small linear expansion coefficient is preferable. Owing to the symmetrical property of the pressure sensor 10 with respect to the centerline C, even when the materials of the housing 12, the supporting shafts 20, the first fixed portions 26, the shaft 28, and the second fixed portion 30 have different linear expansion coefficients, or even when they are formed of any material, displacement in the ±Z directions due to the temperature change does not occur on the centerline C.

The first diaphragm 22 and the second diaphragm 24 (the same characteristics as those of first diaphragm 22) each have a pressure-receiving surface on a surface facing the outside. The pressure-receiving surface is subjected to flexure deformation in the ±Z directions upon receipt of a pressure in a measured pressure environment and transmits a force generated by the flexure deformation to the inside of the housing 12. The first diaphragm 22 and the second diaphragm 24 include center areas 22a and 24a which are displaced by a pressure from the outside, flexible areas 22b and 24b located on the outer peripheries of the center areas 22a and 24a and subjected to the flexure deformation by the pressure from the outside, and peripheral edge areas 22c and 24c located on the outer peripheries of the flexible areas 22b and 24b and joined and fixed to the openings 14a and 18a, respectively. The center area 22a inside the first diaphragm 22 is connected to the one end 28a of the shaft 28 in the longitudinal direction of the shaft 28 (+Z direction), and the center area 24a inside the second diaphragm 24 is connected to the other end 28b opposite from the one end 28a of the shaft 28 in the longitudinal direction (−Z direction).

Recommended material of the first diaphragm 22 and the second diaphragm 24 is those superior in anti-corrosion such as metal like stainless steel or ceramic, or may be monocrystal bodies such as quartz crystal and other amorphous bodies.

Figure 3A:
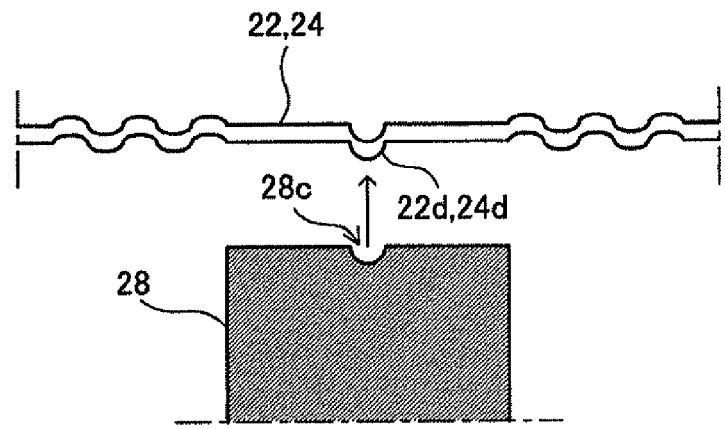
FIGS. 3A to 3D are diagrammatic drawings showing a process of manufacturing a diaphragm according to the first embodiment.

As shown in FIG. 3A, when forming the first diaphragm 22 and the second diaphragm 24 of metal, a metal base material may be pressed from both sides by a pair of press plates (not shown) having wave-shape concentric circles. At this time, by forming a projection (not shown) at a center of one of the pair of press plates (not shown) and a depression (not shown) at a center of the other one of the press plates (not shown), projections 22d and 24d are formed at centers of the respective diaphragms. The projections 22d and 24d are fitted to depressions 28c formed at both ends of the shaft 28. In this case, by bonding and fixing the projections 22d and 24d to the depressions 28c with a bonding device such as low melting point glass or inorganic adhesive agent, when operating the first diaphragm 22, the second diaphragm 24, and the shaft 28 in conjunction with each other, such problems that the connecting portions between the projections 22d and 24d and the depressions 28c are displaced, and hence a force to be transmitted leaks and the pressure detection accuracy is deteriorated may be prevented.

Figure 3B:
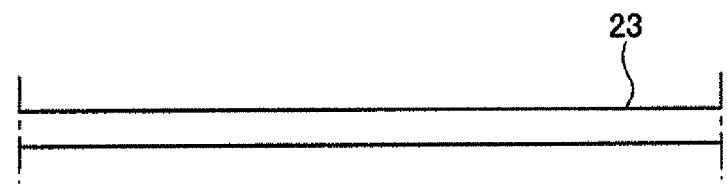
Figure 3C:
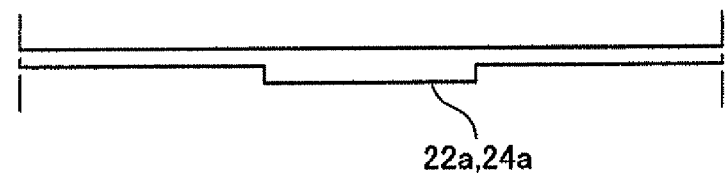
Figure 3D:
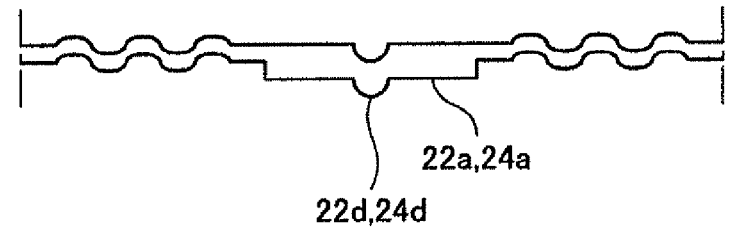

In order to restrain the respective diaphragms from oscillating in association with oscillations of the pressure-sensitive element 32, it is recommended to form the center areas 22a and 24a of the respective diaphragms to be thicker than other areas. In this case, the each diaphragm is formed by preparing a metal base material 23 (FIG. 3B), performing half etching except for the center areas 22a and 24a (FIG. 3C), and pressing the etched metal base material 23 by the pair of press plates (not shown.).

Figure 5A:
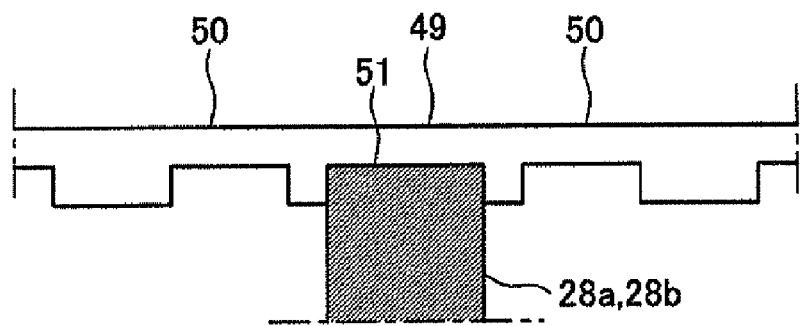
FIGS. 5A and 5B are diagrammatic drawings showing the diaphragm according to the first embodiment.
Figure 5B:
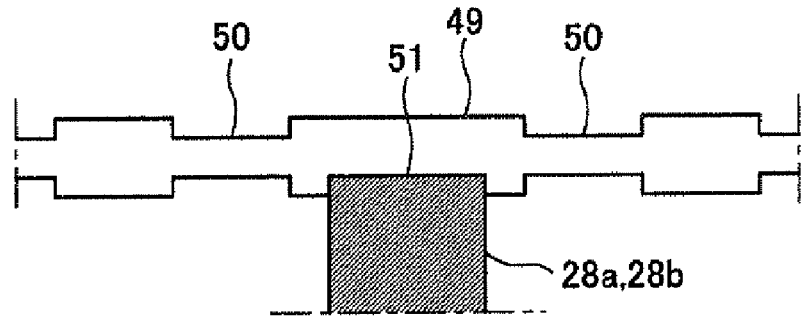
Figure 6A:
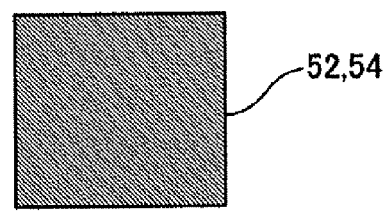
FIGS. 6A to 6F are drawings showing a process of manufacturing a pressure-sensitive element according to the first embodiment.
Figure 6B:
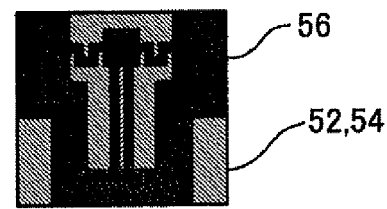
Figure 6C:
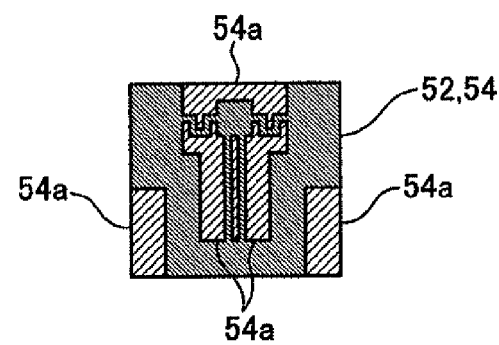
Figure 6D:
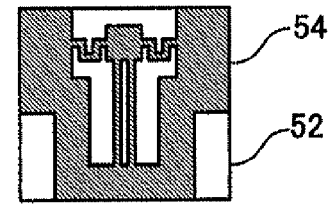
Figure 6E:
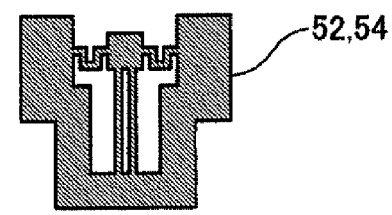
Figure 6F:
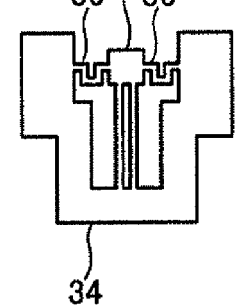

As shown in FIGS. 4A to 4E, when forming the first diaphragm 22 and the second diaphragm 24 with quartz crystal, a photolithography etching process is preferably employed in the same manner. In this case, the each diaphragm is formed by preparing a motherboard 38 as a material, applying a positive-type photoresist 40 on the surface of the motherboard (FIG. 4A), exposing the same using a photo mask 48 corresponding to the positions and the shapes of a center area 42, a flexible area 44, a peripheral edge area (not shown), and a depression 46 for fitting the shaft 28, and exposing the photoresist 40 (FIG. 4B), removing a photoresist 40a after having developed and exposed (FIG. 4C), forming the center area 42, the flexible area 44, the peripheral edge area (not shown), and the depression 46 integrally by half-etching the exposed area of the motherboard 38 (FIG. 4D), and separating the photoresist 40 (FIG. 4E). Then, the one end 28a or the other end 28b of the shaft 28 is fitted to the depression 46 (FIG. 4E). In this case, it is not necessary to form the depression 28c on the shaft 28. Further, as a modification of the photolithography etching process for the each diaphragm, it is preferable to form a depression 51 in a center area 49 and a flexible area 50 by performing the etching process only on one side as shown in FIG. 5A or, alternatively, it is also preferable to perform the etching process at positions opposed to each other on the front and back sides of the flexible area 50 as shown in FIG. 5E.

The first diaphragm 22 and the second diaphragm 24 may be coated on the surfaces exposed to the outside so as to prevent corrosion by liquid or gas or the like. For example, if the diaphragm is formed of metal, it may be coated with a nickel compound and, if the diaphragm is formed of a piezoelectric crystal body such as quarts, it may be coated with silicon.

As described above, since the shaft 28 connects the first diaphragm 22 and the second diaphragm 24, the shaft 28 is not displaced in the ±Z directions when the first diaphragm 22 and the second diaphragm 24 receive the same pressure. When the pressure received by the first diaphragm 22 is larger than the pressure received by the second diaphragm 24, the shaft 28 is displaced in the +Z direction. In contrast, when the pressure received by the second diaphragm 24 is larger than the pressure received by the first diaphragm 22, the shaft 28 is displaced in the −Z direction.

The pressure-sensitive element 32 is formed as a double-ended tuning fork piezoelectric resonator, a single beam type piezoelectric resonator, a SAW resonator, a resonator of thickness shear vibration mode, or the like using piezoelectric material such as quartz crystal, lithium niobate, and lithium tantalite. The pressure-sensitive element 32 is arranged in such a manner that the longitudinal direction thereof is aligned in parallel to the direction of displacement (±Z directions) of the first diaphragm 22, the second diaphragm 24, and the shaft 28, and has a detection axis in the direction of displacement. The pressure-sensitive element 32 is fixed at the first base portion 32a at one end in the longitudinal direction (±Z directions) to the shaft 28 via the second fixed portion 30, and at the second base portion 32b on the opposite side from the first base portion 32a with the intermediary of the oscillating arm 32c to the first fixed portions 26 via the connecting member 34. Therefore, when the shaft 28 is displaced in the +Z direction, the pressure-sensitive element 32 receives an elongation stress, and when the shaft 28 is displaced in the −Z direction, it receives a compression stress, whereby the resonance frequency varies.

The pressure-sensitive element 32 is electrically connected to an electronic oscillator (not shown), and oscillates at the specific resonance frequency by an AC voltage supplied from the electronic oscillator (not shown). Specifically, in the case of the double-ended tuning fork piezoelectric resonator used in the first embodiment, since variation in resonance frequency with respect to elongation and compression stresses is significantly large and hence the variable width of the resonance frequency is large in comparison with the resonator of thickness shear vibration mode, it is preferable for the pressure sensor superior in resolution such as those for detecting a slight pressure difference. In the case of the double-ended tuning fork piezoelectric resonator, the amplitude of the oscillating arm 32c (oscillating portion) is reduced upon receipt of the elongation stress, and hence the resonance frequency is increased. In contrast, since the amplitude of the oscillating arm 32c (oscillating portion) is increased upon receipt of the compression stress, the resonance frequency is reduced. As the piezoelectric substrate of the double-ended tuning fork piezoelectric resonator, quartz crystal is desirable because it is superior in temperature characteristics.

The connecting member 34 is a member for connecting the second base portion 32b of the pressure-sensitive element 32 and the first fixed portions 26 fixed to the side surface portion 16. The connecting member 34 is formed in pair in symmetry with the intermediary of the pressure-sensitive element 32. In other words, the connecting member 34 is formed into a U-shape as a whole, and the second base portion 32b of the pressure-sensitive element 32 is connected to a U-shaped saddle 34a, and the upper end portions 34c of U-shaped two supporting rods 34b are connected to the first fixed portions 26. The pressure-sensitive element 32 is connected to a center portion on the side surface inside the housing 12 via the connecting member 34 and the first fixed portions 26.

The connecting member 34 is provided with a leading electrode (not shown) extending from an excitation electrode (not shown) of the pressure-sensitive element 32. The leading electrode (not shown) is provided on an outer periphery of the opening 18a by wire bonding of an Au line or the like and is electrically connected to a hermetic terminal (not shown) which is electrically connectable to the interior of the housing 12. Accordingly, the electronic oscillator (not shown) of the pressure-sensitive element 32 outside the housing 12 is electrically connected to the pressure-sensitive element 32 via the hermetic terminal (not shown), the wire bonding, and the leading electrode (not shown).

Reinforcing portions 36 are connected to the first base portion 32a of the pressure-sensitive element 32 and the upper end portions 34c of the connecting member 34. Accordingly, the pressure-sensitive element 32 is prevented from being broken away at the time of mounting. The reinforcing portions 36 are formed to be sufficiently thinner than the pressure-sensitive element 32 and the connecting member 34, and are formed into a crank shape to provide a spring property. Therefore, hindrance of the movement of the pressure-sensitive element 32 in the direction of the detection axis is prevented.

When the pressure-sensitive element 32, the connecting member 34, and the reinforcing portions 36 are formed of quartz crystal, respectively, it is preferable to form these members integrally by the photolithography etching process.

FIGS. 6A to 6F are drawings showing a process of the photolithography etching process for the pressure-sensitive element and the connecting member.

When forming the pressure-sensitive element 32, the connecting member 34, and the reinforcing portions 36 integrally by the photolithography etching process, as shown in FIGS. 6A to 6F, a process of preparing a motherboard 52 as a material, applying a positive-type photoresist 54 on the surface of the motherboard 52 (FIG. 6A), exposing the same using a photo mask 56 corresponding to the arrangements and the shapes of the pressure-sensitive element 32, the connecting member 34, and the reinforcing portions 36 (FIG. 6B), exposing the photoresist 54 (FIG. 6C), developing and removing the exposed photoresist 54a (FIG. 6D), forming the pressure-sensitive element 32, the connecting member 34 and the reinforcing portions 36 integrally by etching the exposed area of the motherboard 52 until the motherboard 52 is penetrated therethrough (FIG. 6E), and separating the photoresist 54 (FIG. 6F) is performed.

When the first diaphragm 22 is formed of metal, an assembly of the pressure sensor 10 is achieved by connecting the first diaphragm 22 to the opening by welding or with inorganic adhesive agent or the like and, when the first diaphragm 22 is formed of quartz crystal, bonding is achieved by using the inorganic adhesive agent or the like in a state of sealing the opening 14a of the flange portion 14. In the same manner, the second diaphragm is connected to the opening 18a in a state of sealing the opening 18a of the hermetic terminal portion 18. Then, the pair of first fixed portions 26 are bonded with the inorganic adhesive agent or the like so as to oppose to each other at a center portion inside the side surface portion 16, and the upper end portions 34c of the connecting member 34 and the first fixed portions 26 are bonded with the inorganic adhesive agent or the like. Then, the shaft 28 is inserted through the through hole (not shown) of the second fixed portion 30, and the second fixed portion 30 is bonded to the shaft 28 with the inorganic adhesive agent or the like in a state in which the second fixed portion 30 comes to a center portion of the shaft 28 (position in symmetry in ±Z directions with respect to the centerline C).

Subsequently, the one end 20a of the supporting shaft 20 is fitted to the nib 14d of the flange portion 14 and is bonded thereto with the inorganic adhesive agent or the like, and the inner periphery 16a of the side surface portion 16 and the outer periphery 14b are connected to the thick region of the flange portion 14 by welding or inorganic adhesive agent.

Then, in a state in which the one end 28a of the shaft 28 is directed toward the flange portion 14, the one end 28a of the shaft 28 and the center area 22a of the first diaphragm 22 are bonded with the inorganic adhesive agent or the like, and a plane 30a of the second fixed portion 30 and the first base portion 32a of the pressure-sensitive element 32 are connected with the inorganic adhesive agent or the like. After having fixed the connecting member 34 to the first fixed portion 26 and fixed the first base portion 32a to the second fixed portion 30, the reinforcing portions 36 may be broken and removed as shown in FIG. 1.

Subsequently, the nib 18d of the hermetic terminal portion 18 and the other end 20b of the supporting shaft 20 are fitted and bonded with the inorganic adhesive agent or the like, the other end 28b of the shaft 28 and the second diaphragm 24 are bonded with the inorganic adhesive agent, and the outer periphery 18b of the hermetic terminal portion 18 and the inner periphery 16a of the side surface portion 16 are welded or bonded with the inorganic adhesive agent or the like. Finally, air is sucked from a vacuum sealing hole (not shown) formed on the side surface portion 16 and the hole is sealed, so that the pressure sensor 10 according to the first embodiment is constructed.

In the pressure sensor 10 having the configuration as described above, a connecting area of the pressure-sensitive element 32 with the shaft 28 and a connecting area of the same with the housing 12 are aligned on a line (centerline C) vertical to the detection axis of the pressure-sensitive element 32. Since the connecting member 34 is formed of the same material as the pressure-sensitive element 32 and is a member extending from the second base portion 32b of the pressure-sensitive element 32, even though the pressure-sensitive element 32 is expanded or contracted in the direction of the detection axis due to the temperature change, the relative position of the connecting area described above in the direction of the detection axis does not change. Therefore, the pressure-sensitive element 32 is prevented from receiving a stress caused by the linear expansion of the pressure-sensitive element 32.

Further, the first base portion 32a of the pressure-sensitive element 32 is connected to the center portion (second fixed portion 30) of the shaft 28, and the second base portion 32b is connected to the center portion of the side surface of the housing 12 via the connecting member 34 and the first fixed portion 26. At this time, even when the linear expansion coefficients of the housing 12 and the shaft 28 are different from each other, since the amounts of linear expansion in the directions of both ends (±Z directions) of the housing 12 with reference to the center portion of the housing 12 (centerline C) are the same, and the amounts of linear expansion of the shaft 28 with reference to the center portion of the shaft 28 in the direction toward the both ends (±Z directions) are the same, the relative position of the center portion of the housing 12 and the center portion of the shaft 28 in the direction of the detection axis does not change. Therefore, the pressure-sensitive element 32 is avoided from receiving a stress caused by variations in relative position between the center portion of the housing 12 and the center portion of the shaft 28.

The connecting member 34 is formed in pair with the intermediary of the pressure-sensitive element 32. Accordingly, the pressure-sensitive element 32 is not bent toward the connecting member 34, and hence the pressure-sensitive element 32 is prevented from moving in the direction other than the direction of the detection axis, the sensitivity of the pressure-sensitive element 32 in the direction of the detection axis is improved, so that the pressure sensor 10 with high degree of accuracy is achieved.

In addition, the first base portion 32a of the pressure-sensitive element 32 is connected to the connecting member 34 via the reinforcing portions 36. Accordingly, when the pressure-sensitive element 32 and the connecting member 34 are formed integrally, the pressure-sensitive element 32 is prevented from being broken at the time of mounting, and hence improvement of yield and cost down of the pressure sensor 10 are achieved.

Figure 7:
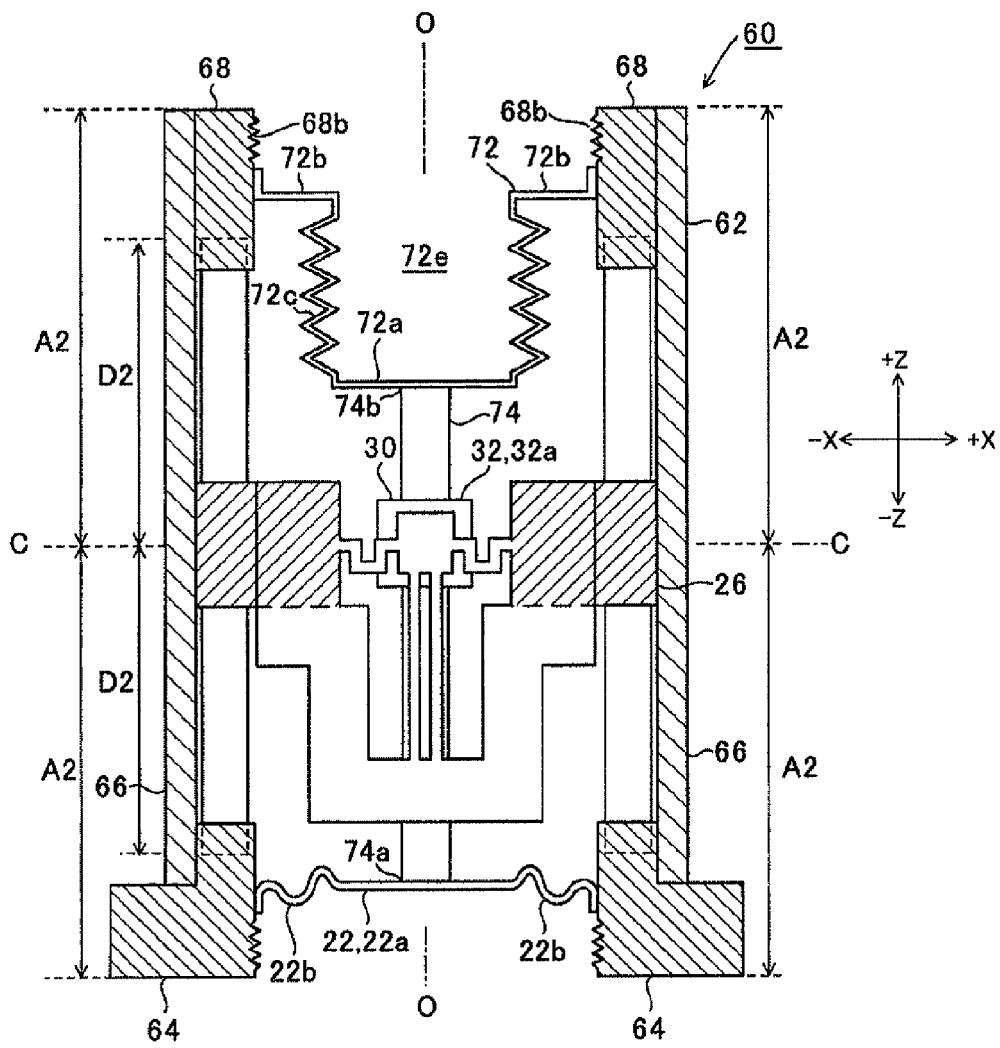
FIG. 7 is a diagrammatic front view of the pressure sensor according to a second embodiment.

A pressure sensor 60 according to a second embodiment is shown in FIG. 7. In the pressure sensor according to the second embodiment, at least one of the pressure-receiving devices is a first bellows 72 expandable inward of the housing 62 and, in the second embodiment, is connected so as to seal an opening 68a of a hermetic terminal portion 68, and the first bellows 72 and the first diaphragm 22 are fixed by a shaft 74. In addition, a housing 62, supporting shafts 70, and the shaft are formed of the same material. In the following description, components common to the first embodiment are designated by the same reference numerals, and the description is omitted unless otherwise specifically needed.

The first bellows 72 includes a circular pressure-receiving portion 72a displaced in the ±Z directions upon receipt of a force, a ring-shaped outer peripheral portion 72b connected to an inner periphery of the opening 68a of the hermetic terminal portion 68, and an expandable portion 72c connected to the outer periphery of the pressure-receiving portion 72a while sealing the inner periphery of the outer peripheral portion 72b and configured to expand and contract in the ±Z directions in association with the displacement of the pressure-receiving portion 72a.

The shaft 74 is a member having a constant rigidity and having a longitudinal direction in the ±Z directions, and is connected at one end 74a to the first diaphragm 22 and at the other end 74b to the pressure-receiving portion 72a. Since the shaft 74 connects the first diaphragm 22 and the first bellows 72, the shaft 74 is not displaced in the ±Z directions when the first bellows 72 and the first diaphragm 22 receive the same pressure. When the pressure received by the first bellows is larger than the pressure received by the first diaphragm, the shaft 74 is displaced toward the first diaphragm 22 (−Z direction). When the pressure received by the first bellows 72 is smaller than the pressure received by the first diaphragm 22, the shaft 74 is displaced toward the first bellows 72 (+Z direction).

As the first bellows 72, a member having the same characteristics as the first diaphragm 22 is used. In other words, the pressure-receiving area of the first bellows (surface area of pressure-receiving portion 72a) and the pressure-receiving area of the first diaphragm 22 (surface areas of center area 22a and flexible area 22b) are equalized, and the strength or the like of the expandable portion 72c is adjusted so as to make the pressure-receiving sensitivity of the first bellows 72 and the pressure-receiving sensitivity of the first diaphragm 22 equalized, so that the amounts of displacement by the same pressure are equalized, that is, the stresses applied to the shaft 74 are equalized. Accordingly, even when the first diaphragm 22 is used on one side and the first bellows 72 is used on the other side, the relative pressure can be measured. By connecting the first bellows 72 to the opening 68a, a depression 72e having the expandable portion 72c on the side surface and the pressure-receiving portion 72a on the bottom surface is formed.

Figure 8:
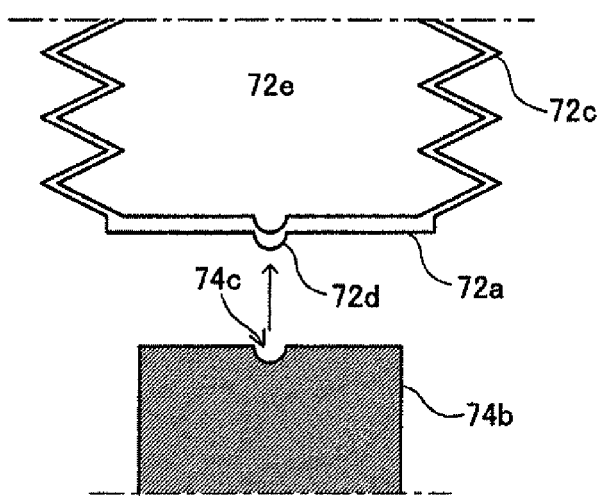
FIG. 8 is a diagrammatic drawing showing a first bellows according to the second embodiment.

The first bellows 72 is formed of metal or the like, and the pressure-receiving portion 72a, the outer peripheral portion 72b, and the expandable portion 72c may be formed by a pressing work respectively and connected by welding or the like. In this case, as shown in FIG. 8, the pressure-receiving portion 72a is formed with a projection 72d on a surface opposite from a surface thereof surrounded by the expandable portion 72c so as to be fitted into a depression 74c formed on the other end 74b of the shaft 74 in the same manner as the first embodiment. The expandable portion 72c is formed by metal-plating on the surface of a male die (not shown) of the expandable portion 72C and pressing the same in a state of clamping the metal-plate with a female die (not shown) having depressions following the outer shape of the male die (not shown).

The second fixed portion 30 is fixed to a position of the centerline C of the shaft 74. The pair of first fixed portions 26 connected to the connecting member 34 are fixed to a side surface portion 66 on the centerline C. In the second embodiment, the fixed positions of the first fixed portions 26, the second fixed portion 30, and the first base portion 32a of the pressure-sensitive element 32 are needed to be the same position in the ±Z directions. However, since the housing 62 and the shaft 74 are formed of the same material, they do not have to be positioned on the centerline C, and a bisectional line in the ±Z directions of the shaft 74 does not have to match the centerline C. Further, since the housing 62 and the shaft 74 are formed of the same material, difference in displacement in the ±Z directions between a first fixed position and a second fixed position does not occur due to the temperature change, and hence the pressure-sensitive element is not subjected to the stress in association with the change in relative position between a first fixing member and a second fixing member due to the temperature change.

As shown in FIG. 7, an inner screw portion 68b is formed on the opening 68a of the hermetic terminal portion 68. Therefore, by screwing a connector (not shown) having an outer screw portion (not shown) having the same diameter as the inner screw portion 68b and being connected to piping (not shown) connected to the pressure measured environment into the inner screw portion 68b, the housing 62 and the connector (not shown) can be connected. In the second embodiment, although the second diaphragm 24 is replaced by the first bellows 72, the assembling procedure is the same as the first embodiment, and hence description is omitted.

Figure 9:
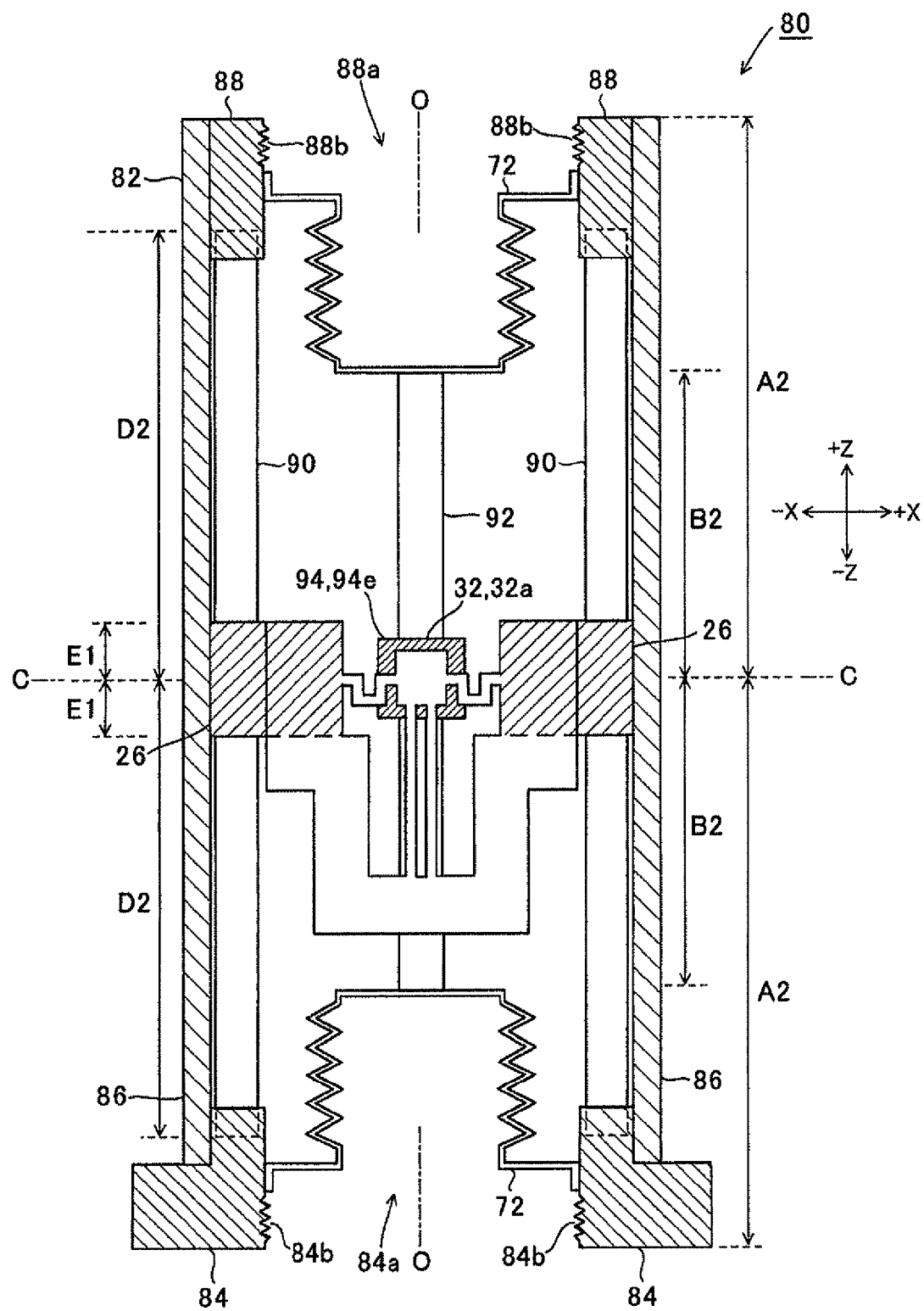
FIG. 9 is a diagrammatic front view of the pressure sensor according to a third embodiment.
Figure 10:
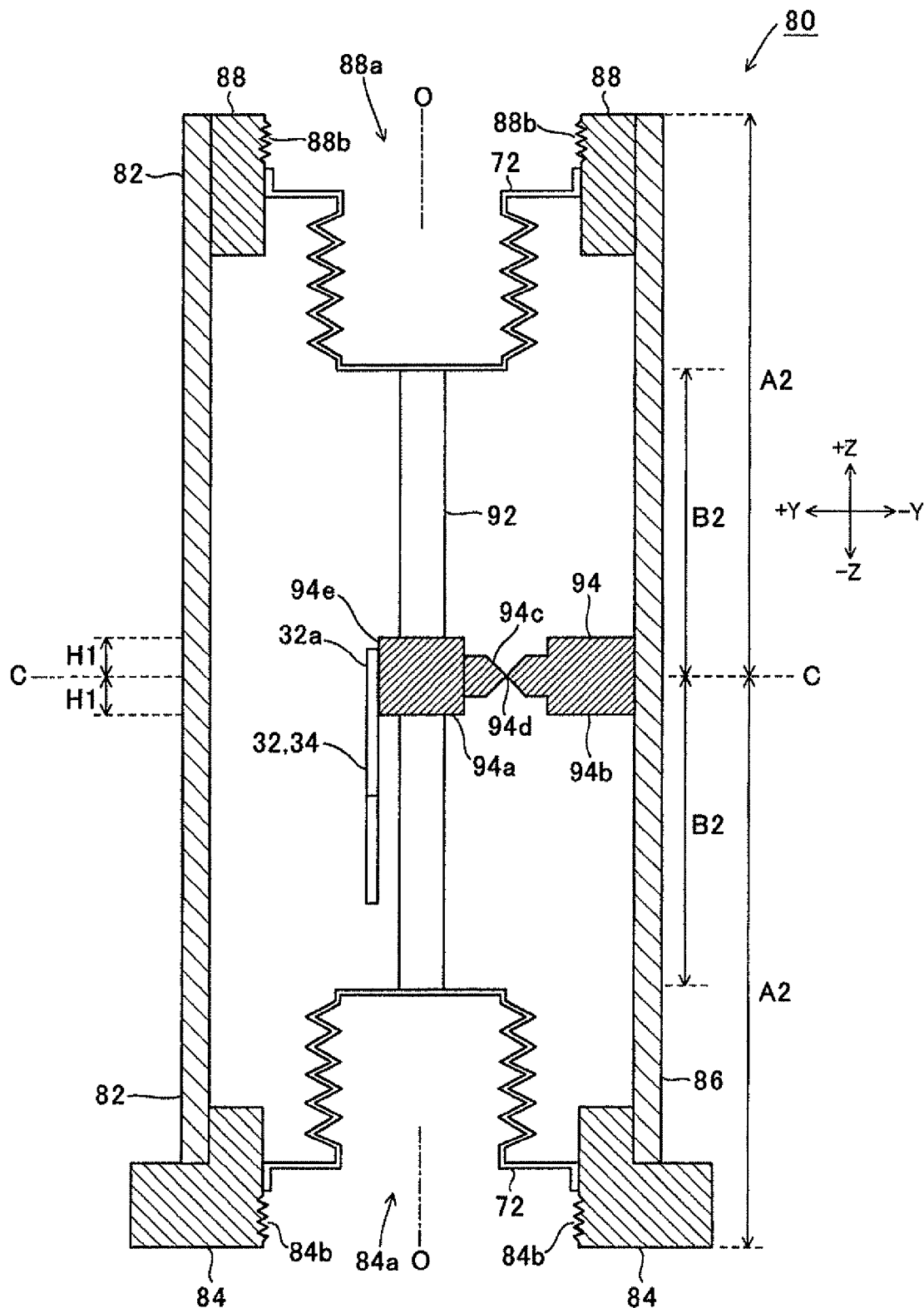
FIG. 10 is a diagrammatic side view of the pressure sensor according to the third embodiment.

A pressure sensor 80 according to a third embodiment is shown in FIGS. 9 and 10. FIG. 9 is a diagrammatic drawing viewed from the front (XZ plane), and FIG. 10 is a diagrammatic drawing viewed from the side (YZ plane). The pressure sensor 80 according to the third embodiment has a configuration in which both of the pressure-receiving devices are made up of the first bellows 72 expandable inwardly of the housing and the first bellows 72 are connected by a shaft 92 with each other, a center portion of the shaft 92 is fixed to a center portion of a side surface portion 86, and is held by the cantilever 94.

As in the second embodiment, an opening 84a of a flange portion 84, and an opening 88a of the hermetic terminal portion 88 are formed with female screw portions 84b and 88b, so that connection with the connector having a female screw portion is easily achieved.

With reference to the centerline C, the lengths of a housing 82 in the ±Z directions, that is, the lengths to an upper end and to a lower end are equally A2 and, in the same manner, the lengths of a supporting shaft 90 to an upper end and to a lower end are equally D2, and the lengths of the shaft 92 to an upper end and to a lower end are equally B2. Also, the first fixed portions 26 are fixed to the inside of the side surface portion 86 on the centerline C, the length thereof in the ±Z directions are equally E1, the cantilever 94 is fixed to the inside of the side surface portion 86 on the centerline C, and the lengths in the ±Z directions are equally H1. The first base portion 32a of the pressure-sensitive element 32 is connected to one end 94a of the cantilever in the same arrangement as in the first embodiment, and the first base portion 32a of the pressure-sensitive element 32 is fixed to the shaft 92 via one surface 94e of the cantilever 94.

Accordingly, as described in the first embodiment, even when the housing 82 (flange portion 84, side surface portion 86, and hermetic terminal portion 88), the supporting shaft 90, the shaft 92, and the cantilever 94 are formed of different types of materials, the bisectional lines of the respective members overlapped with the centerline C are not displaced due to the temperature change, and hence the pressure-sensitive element 32 is prevented from receiving a stress caused by the difference in displacement between the first fixed portions 26 and the one surface 94e due to the temperature change.

When the housing 82 is inclined or the like, the first bellows 72 are deflected in the direction other than the ±Z directions, and hence the shaft 92 connected thereto at both ends moves also in the direction other than the ±Z directions. In order to avoid such an event, the shaft 92 is held by the cantilever 94.

The cantilever 94 integrally includes a holding portion 94a having a through hole (not shown) penetrated therethrough in the ±Z directions and holding the shaft 92 in a state of being penetrated through the through hole (not shown), a third fixing portion 94b to be fixed to the inside of the side surface portion 86 on the centerline C, and a bent portion 94c provided between the holding portion 94a and the third fixing portion 94b and being bendable in the ±Z directions. The first base portion 32a of the pressure-sensitive element 32 is connected to the one surface 94e of the holding portion 94a.

The cantilever 94 is connected to the side surface portion 86 at a position on the centerline C rotated with respect to the first fixed portions 26 about the center axis O by 90° in order to avoid interference with the first fixed portions 26.

In the cantilever 94, the holding portion 94a has rigidity in conjunction with the side surface portion 86, and the third fixing portion 94b has a rigidity in conjunction with the shaft 92. In contrast, the bent portion 94c is formed with a thinned bent point 94d formed by cutting a ridge line at an apex of the V-shape so as to extend in the ±Y directions (line normal to XZ plane). Accordingly, the cantilever 94 is bent in the ±Z directions, but is not bent in other directions. Accordingly, the shaft 92 is prevented from moving in the direction other than the ±Z directions.

An assembly of the pressure sensor 80 according to the third embodiment is basically the same as the first embodiment and the second embodiment, and may be achieved by allowing the shaft 92 to penetrate through the through hole (not shown) of the holding portion 94a of the cantilever 94 so that the holding portion 94a is arranged on the centerline C after assembly, bonding the same with inorganic adhesive agent or the like, bonding one end 92a of the shaft 92 to the first bellows 72 connected to the flange portion 84 with inorganic adhesive agent or the like, bonding the third fixing portion 94b of the cantilever 94 to the side surface portion 86 at a position on the centerline C rotated by 90° from the positions where the first fixed portions 26 are fixed about the center axis O with the inorganic adhesive agent or the like, and bonding the first base portion 32a of the pressure-sensitive element and the one surface 94e of the holding portion 94a with the inorganic adhesive agent or the like.

Figure 11:
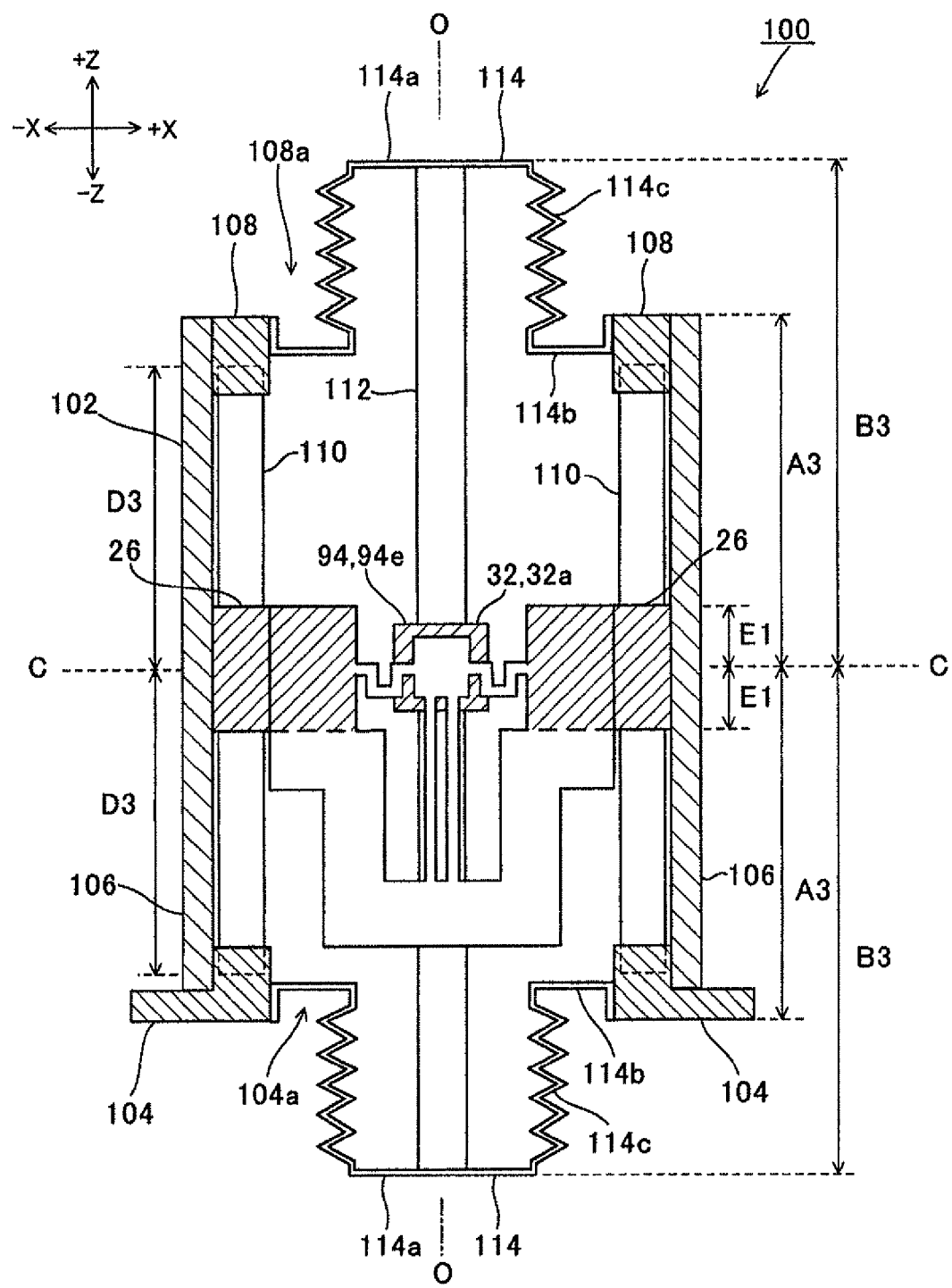
FIG. 11 is a diagrammatic front view of the pressure sensor according to a fourth embodiment.
Figure 12:
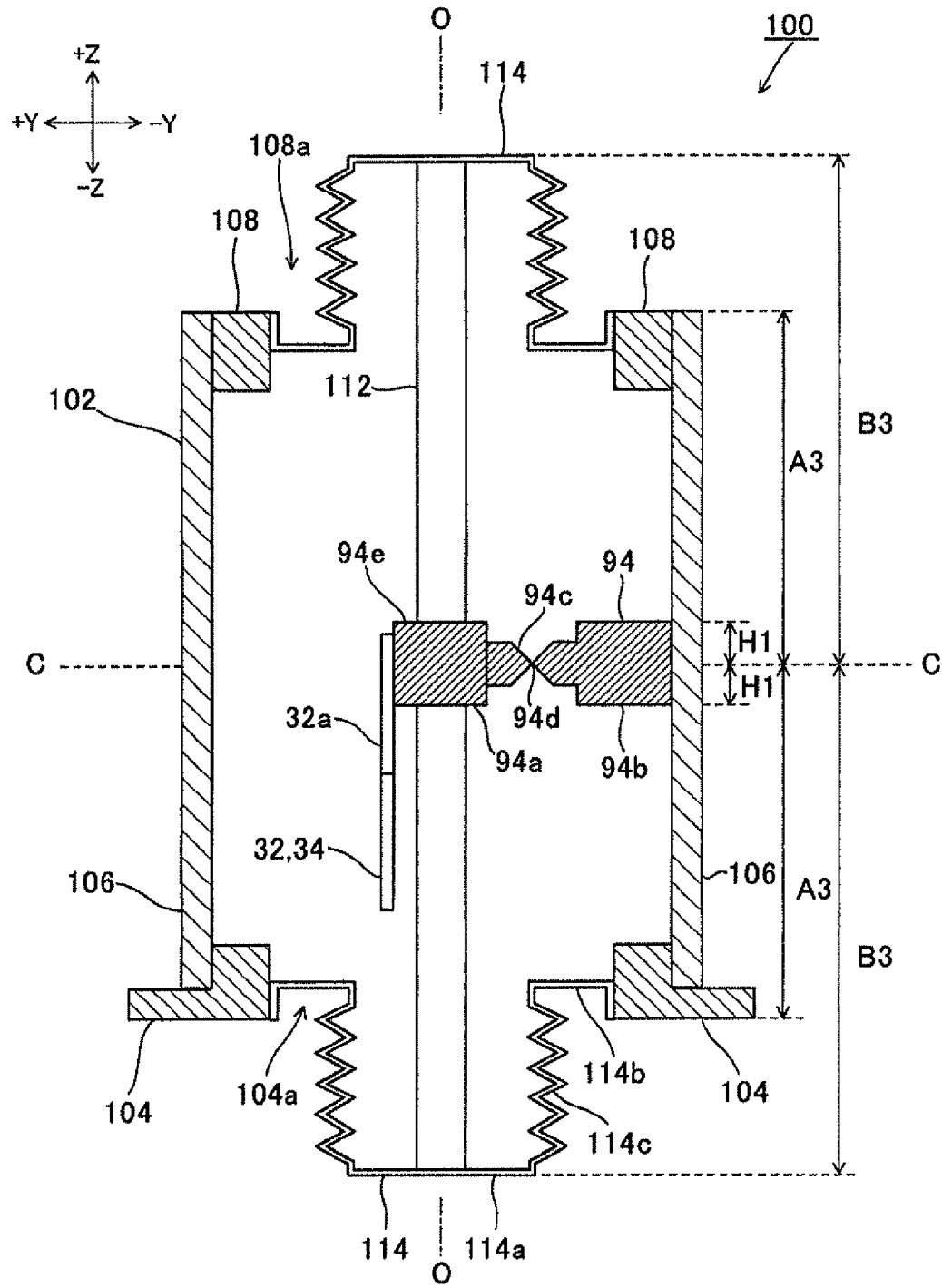
FIG. 12 is a diagrammatic front view of the pressure sensor according to the fourth embodiment.

A pressure sensor 100 according to a fourth embodiment will be shown in FIGS. 11 and 12. FIG. 11 is a diagrammatic drawing viewed from the front (XZ plane) and FIG. 12 is a diagrammatic drawing viewed from the side surface (YZ plane). The pressure sensor 100 according to the fourth embodiment is configured in such a manner that the pair of pressure-receiving devices are both second bellows 114 expandable outward of the housing, and are connected so as to seal openings 104a and 108a, respectively.

In the fourth embodiment as well, with reference to the centerline C, the lengths of a housing 102 in the ±Z directions, that is, the lengths to an upper end and to a lower end are equally A3 and, in the same manner, the lengths of a supporting shaft 110 to an upper end and to a lower end are equally D3, and the lengths of a shaft 112 to an upper end and to a lower end are equally B3. Also, the first fixed portions 26 are fixed to the inside of the side surface portion 86 on the centerline C, the length thereof in the ±Z directions are equally E1, the cantilever 94 is fixed to the inside of a side surface portion 106 on the centerline C, and the lengths in the ±Z directions are equally H1. The first base portion 32a of the pressure-sensitive element 32 is connected to the one end 94a of the cantilever in the same arrangement as in the third embodiment, and the first base portion 32a of the pressure-sensitive element 32 is fixed to the shaft via the one surface 94e of the cantilever 94.

Accordingly, as described in the third embodiment as well, even when the housing 102 (flange portion 104, side surface portion 106, and hermetic terminal portion 108), the supporting shaft 110, the shaft 112, and the cantilever 94 are formed of different types of materials, the bisectional lines of the respective members overlapped with the centerline C are not displaced due to the temperature change, and hence the pressure-sensitive element 32 is prevented from receiving a stress caused by the difference in displacement between the first fixed portions 26 and the one surface 94e due to the temperature change.

Figure 13:
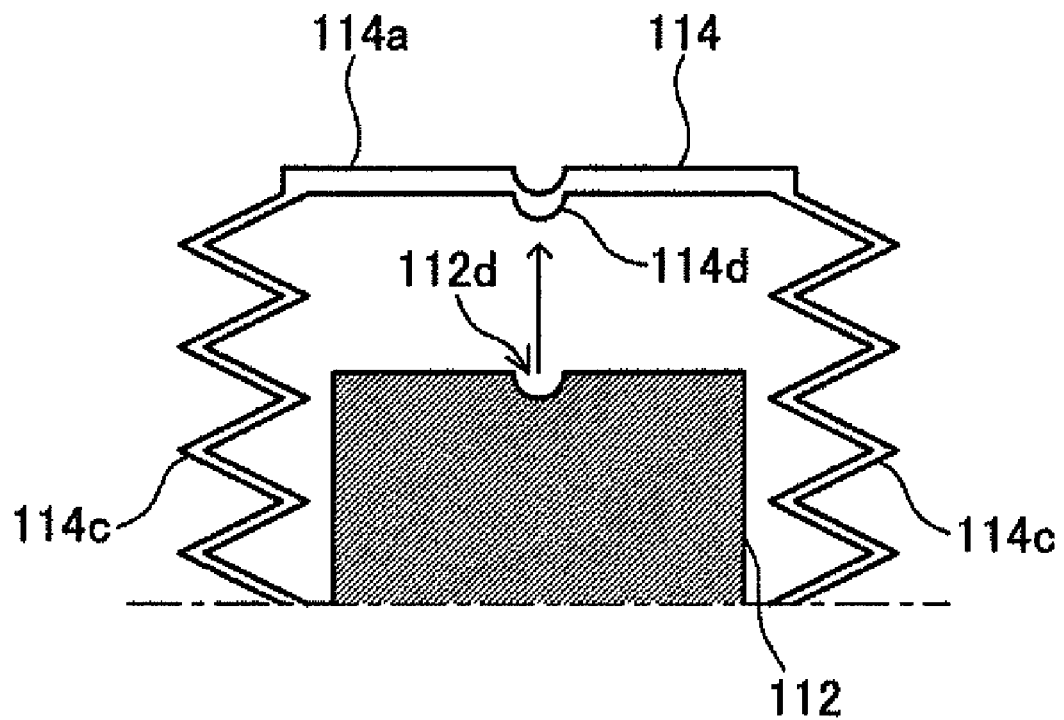
FIG. 13 is a diagrammatic drawing showing a second bellows according to the fourth embodiment.

The second bellows 114 are formed of metal or the like in the same manner as the first bellows 72, and includes a pressure-receiving portion 114a, an outer peripheral portion 114b, and an extendable portion 114c, and may be formed in the same manner as the first bellows 72. However, as shown in FIG. 13, by forming a projection 114d on a surfaces of the pressure-receiving portion 114a surrounded by the extendable portion 114c, the projection 114d may be fitted into a depression 112c formed on the shaft 112 in the same manner as the second embodiment. The shaft 112 is inserted through the holding portion 94a of the cantilever 94 in the same arrangement as the third embodiment, and fixed thereto, and the cantilever is fixed to the side surface portion 106 in the same manner as the third embodiment.

In the fourth embodiment, the extendable portion 114c of the second bellows 114 is exposed to the outside. Therefore, for example, when the relative pressure of liquid or the like is measured directly by the second bellows 114 in a sluice facility or the like, since the depression 72e formed by the first bellows 72 does not exist in contrast to the third embodiment, and hence entry of the liquid into the extendable portion 114c does not occur and, in addition, air or the like contained in the liquid does not enter, whereby accurate measurement of the pressure is achieved.

Figure 14:
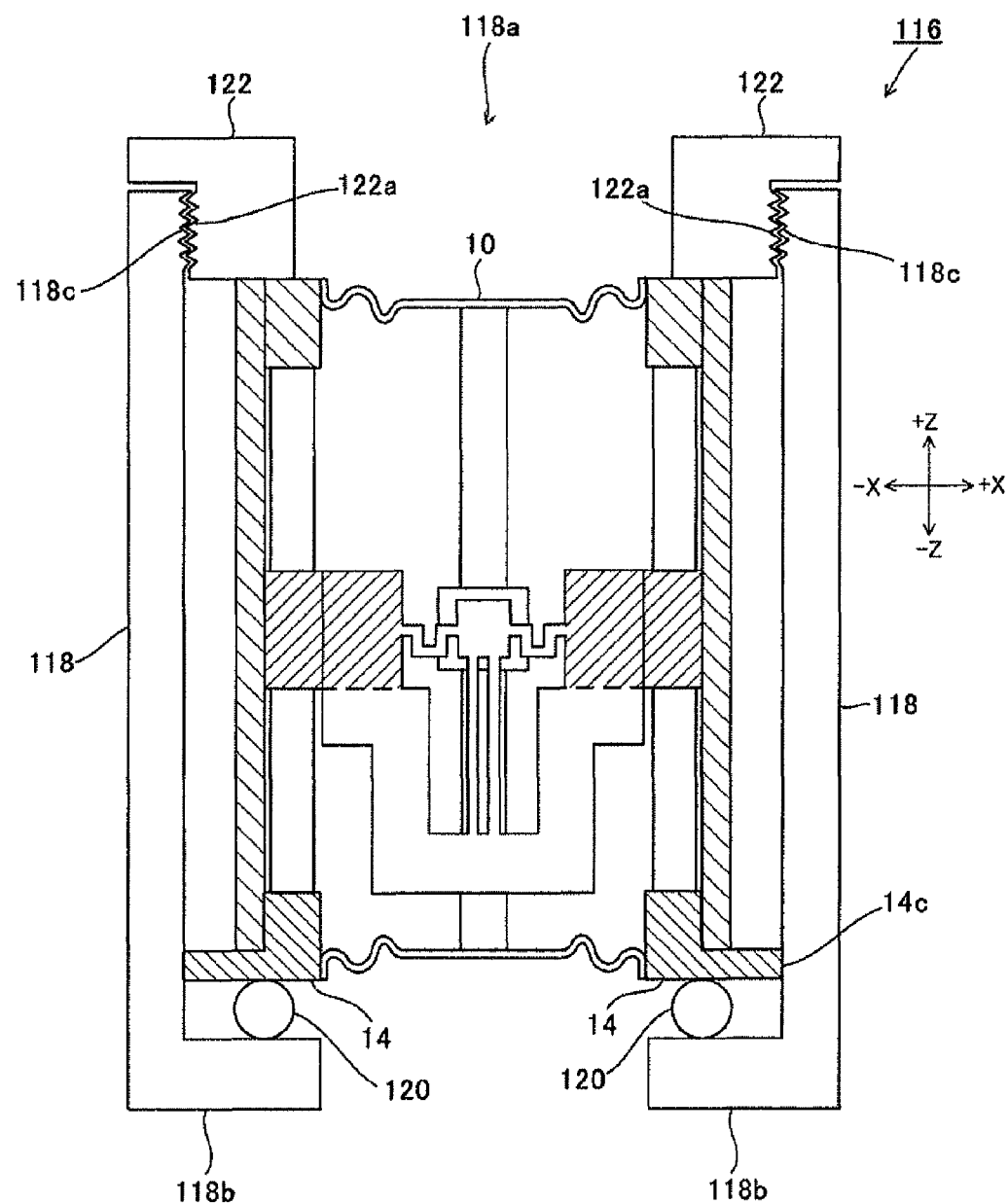
FIG. 14 is a diagrammatic view of a case for mounting the pressure sensor according to the embodiment.

In any embodiment, the pressure sensor can be mounted in a case 116 as shown in FIG. 14. In FIG. 14, description is given on the basis of the first embodiment. The case 116 includes a first member 118 having an opening 118a of approximately the same size as an outer periphery 14c in a thinned area of the flange portion 14 for introducing the housing 12 from the flange portion 14 side at one end and a ring-shaped stopper 118b for stopping the flange portion 14 at the other end, an O-ring 120 arranged concentrically with the stopper 118b on the stopper and being interposed between the stopper 118b and the flange portion 14, and a second member 122 having a male screw portion 122a to be screwed into a female screw portion 118c formed at the opening 118a of the first member 118 for pressing the flange portion 14 against the O-ring 120 while causing the male screw portion 122a to be screwed into the female screw portion 118c and sealing the opening 118a in the case 116 with respect to the stopper 118b. Accordingly, the pressure sensor 10 can be mounted only by screwing the second member into the first member, and spatial isolation between the measured environment side on the side of the flange portion 14 and the measuring environment side on the side of the hermetic terminal portion 18 is achieved easily and reliably.

Figure 15:
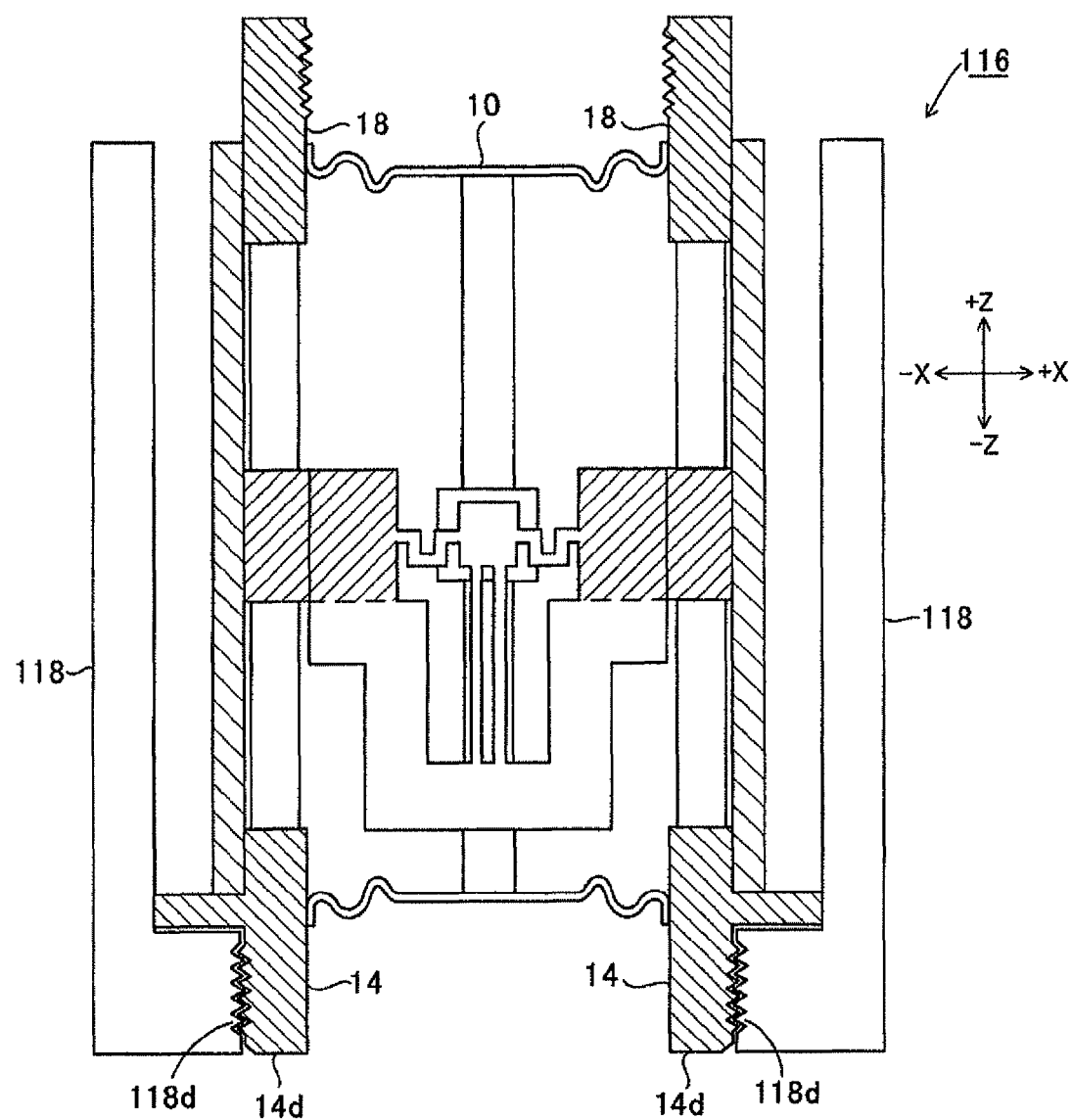
FIG. 15 is a diagrammatic view of the case for mounting the pressure sensor according to the embodiment.

As shown in FIG. 15, a configuration in which spatial isolation between the measured environment side on the side of the flange portion 14 and the measuring environment side on the side of the hermetic terminal portion 18 is achieved by providing the male screw portion 14d on the flange portion 14, providing the female screw portion 118c on the first member 118, and screwing the male screw portion 14d into the female screw portion 118c is also applicable. When screwing, it is recommended to wind a seal tape on the male screw portion 14d to prevent leak of air or liquid or the like from between the male screw portion 14d and the female screw portion 118c. In the same manner, a configuration in which a female screw portion 18c is provided on the hermetic terminal portion 18 and a connector (not shown) having a male screw to be screwed into the female screw portion 18c is connected thereto is also applicable.

The cantilever 94 may be provided in the first embodiment and in the second embodiment as well. In this case, the holding portion 94a is fixed to the shaft 28 or 74 so that the holding portion 94a of the cantilever 94 is positioned at a position to fix the second fixed portion 30 of the shaft 28 or 74, and the first base portion 32a of the pressure-sensitive element 32 is fixed to the one surface 94e of the holding portion 94a.

Figure 16:
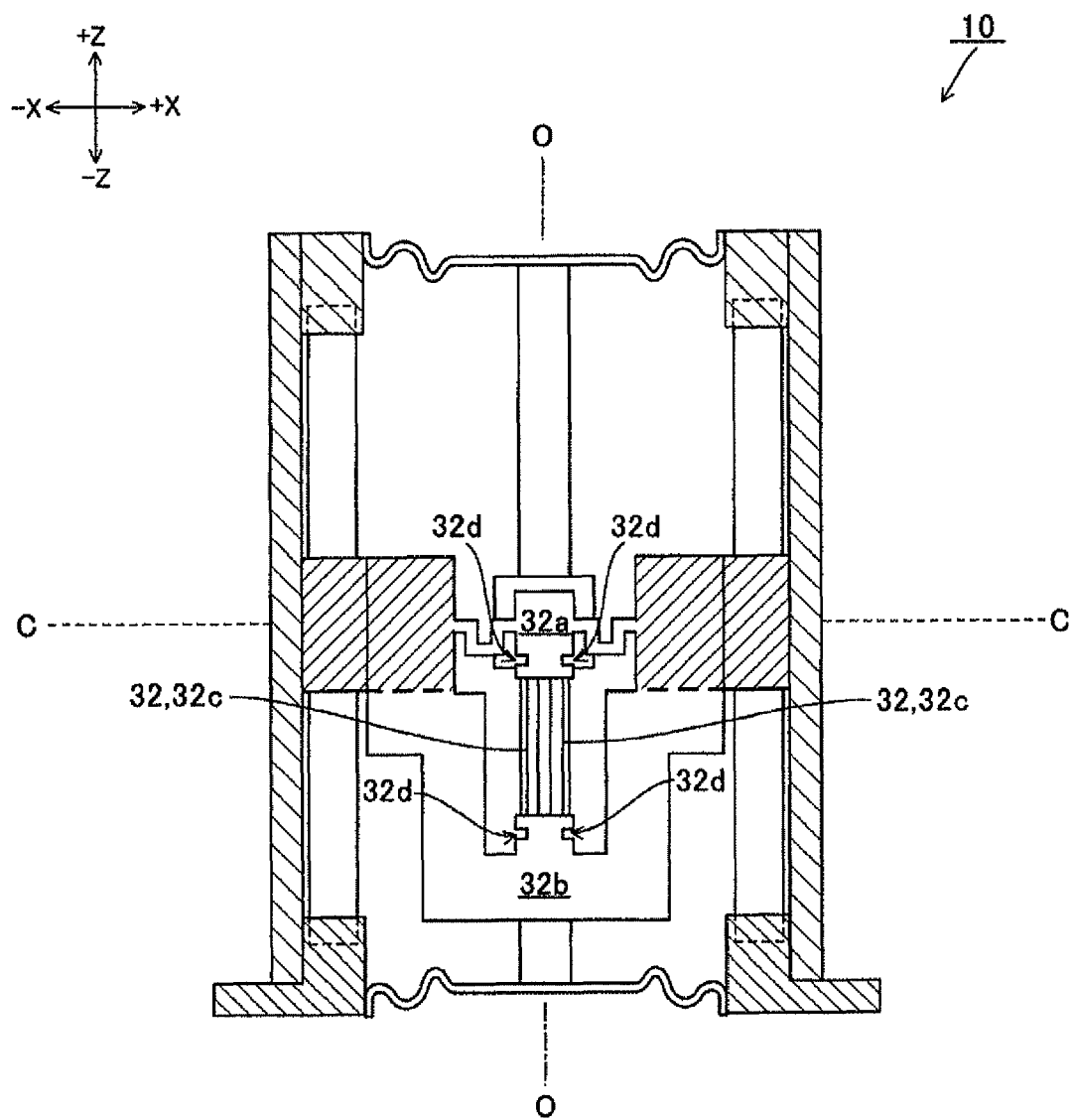
FIG. 16 is a diagrammatic drawing showing a first modification of a pressure-sensitive element.

FIG. 16 is a diagrammatic drawing showing a first modification of the pressure-sensitive element. As is disclosed in Japanese Patent No. 2639527, it is preferable to stabilize the resonance frequency by preventing leakage of vibration energy and enhancing the Q value by providing narrowed portions 32d between the oscillating arm 32c and the first base portion 32a of the pressure-sensitive element 32 and between the oscillating arm 32c and the second base portion 32b.

Figure 17:
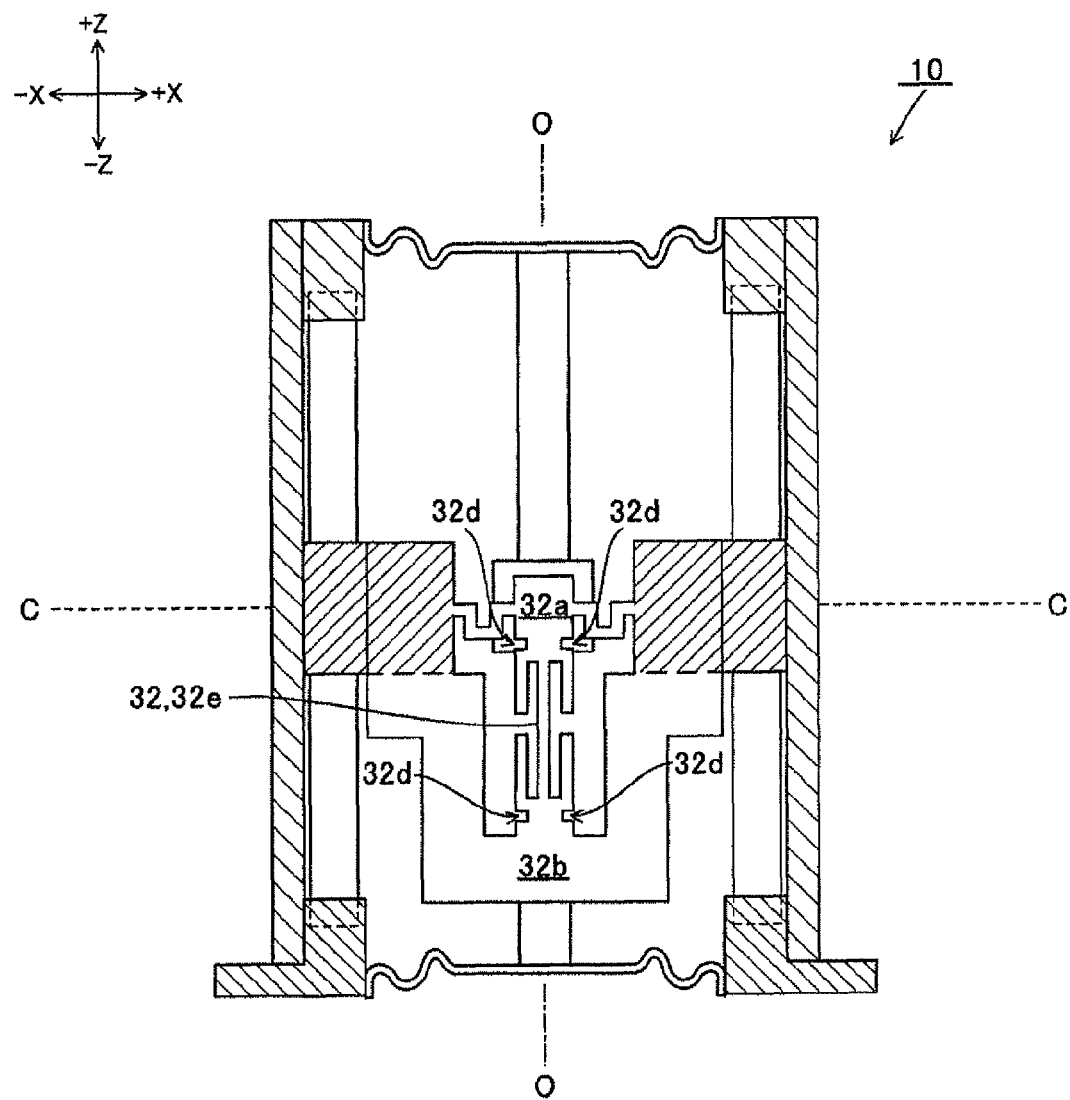
FIG. 17 is a diagrammatic drawing showing a second modification of the pressure-sensitive element.
Figure 18:
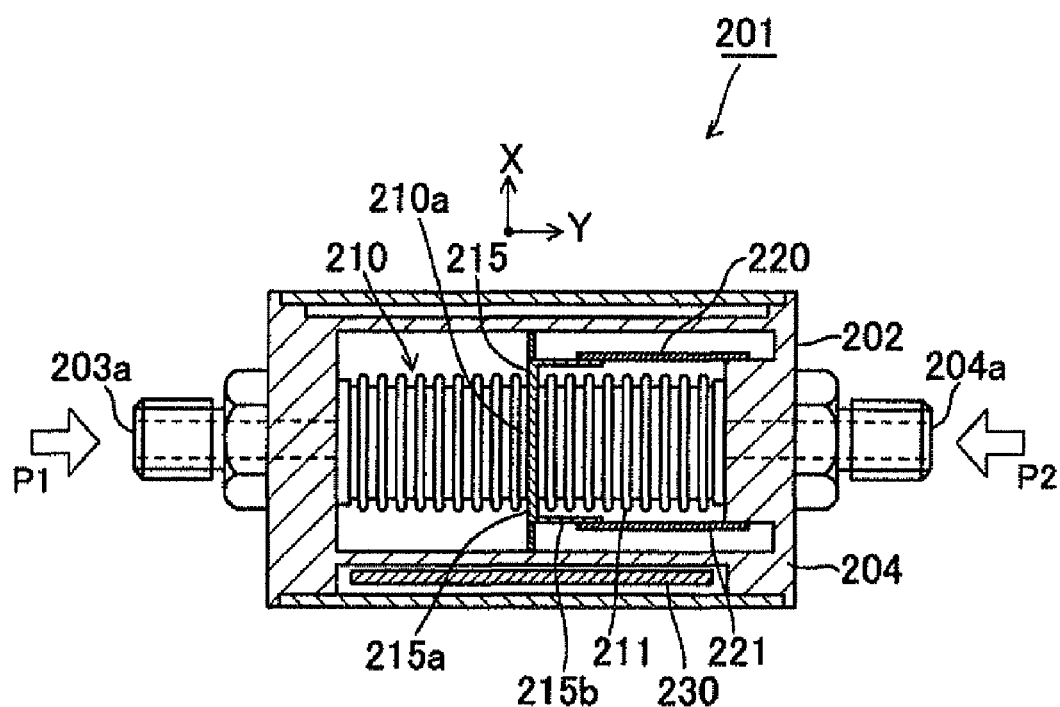
FIG. 18 is a diagrammatic drawing showing a pressure sensor according to the related art.

FIG. 17 is a diagrammatic drawing showing a second modification of the pressure-sensitive element. As disclosed in JP-A-56-119519, it is also preferable to obtain sensitivity two times the case of the two column-shaped beams by configuring the oscillating portion 32e of the pressure-sensitive element 32 with one single column-shaped beam and causing a tensile stress generated in the interior of the pressure-sensitive element 32 to concentrate onto the single column-shaped beam.

The entire disclosure of Japanese Patent Application No. 2009-051176, filed Mar. 4, 2009 is expressly incorporated by reference herein.

What is claimed is:

1. A pressure sensor comprising:
    a housing having openings at both ends thereof;
    a pair of pressure-receiving devices configured to seal the openings respectively and transmit a pressure from the outside to the interior of the housing;
    a force transmission device configured to connect the pair of pressure-receiving devices and transmit a force that one of the pressure-receiving devices receives to the other pressure-receiving device; and
    a pressure-sensitive element having a pressure-sensitive portion and a pair of base portions to be connected to both ends of the pressure-sensitive portion, wherein
    a line connecting the pair of base portions and a detection axis, which is a direction of detection of the force, and the direction of displacement of the force transmission device are arranged in parallel;
    the one of the base portions is a first fixed portion,
    a pair of connecting devices extending from the other base portion so as to interpose the pressure-sensitive portion are connected respectively to a pair of second fixed portions arranged at positions in symmetry with respect to the first fixed portion,
    the first fixed portion is fixedly supported by the force transmission device, and
    the second fixed portions are supported and fixed to portions where a line connecting the first fixed portion and the pair of second fixed portions intersect the housing.

2. The pressure sensor according to claim 1, wherein at least one of the pair of pressure-receiving devices is a bellows expanding inward of the housing, and a pressure-receiving portion of the bellows and the force transmission device are connected.

3. The pressure sensor according to claim 1, wherein the pair of pressure-receiving devices are second bellows expanding outward of the housing, and pressure-receiving portions of the second bellows and the force transmission device are connected.

4. The pressure sensor according to claim 1, wherein the force transmission device is held by a cantilever being fixed at one end to the housing and at the other end on the opposite side from the one end to the force transmission device, and being capable of bending in the direction of displacement of the force transmission device.

5. The pressure sensor according to claim 1, wherein the pressure-sensitive element includes the base portions provided at both end portions thereof, and an oscillating portion between the base portions provided at the both end portions.

6. The pressure sensor according to claim 1, wherein connecting devices are formed in symmetry in pair with the intermediary of the pressure-sensitive element.

7. The pressure sensor according to claim 1, wherein one end of the pressure-sensitive element and the connecting devices are connected by reinforcing portions.

* * * * *